(12) United States Patent
Taniyama et al.

(10) Patent No.: US 11,785,177 B2
(45) Date of Patent: Oct. 10, 2023

(54) RECORD-AND-REPLAY CONTROL DEVICE, REPLAY CONTROL DEVICE, AND RECORD-AND-REPLAY CONTROL METHOD

(71) Applicant: JVCKENWOOD Corporation, Yokohama (JP)

(72) Inventors: Hirofumi Taniyama, Yokohama (JP); Yasutoshi Sakai, Yokohama (JP); Keita Hayashi, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 17/391,080

(22) Filed: Aug. 2, 2021

(65) Prior Publication Data

US 2021/0360188 A1    Nov. 18, 2021

Related U.S. Application Data

(63) Continuation of application No. PCT/JP2019/044553, filed on Nov. 13, 2019.

(30) Foreign Application Priority Data

Feb. 26, 2019 (JP) .................. 2019-033330
Feb. 26, 2019 (JP) .................. 2019-033344

(51) Int. Cl.
*H04N 5/77* (2006.01)
*G11B 27/00* (2006.01)
(Continued)

(52) U.S. Cl.
CPC ............. *H04N 5/77* (2013.01); *G11B 27/007* (2013.01); *H04N 7/183* (2013.01); *H04N 9/87* (2013.01)

(58) Field of Classification Search
CPC .. G11B 27/031; G11B 27/007; G07C 5/0866; G07C 5/085; H04N 7/188; H04N 9/87;
(Continued)

(56) References Cited

U.S. PATENT DOCUMENTS 6,389,340 B1 * 5/2002 Rayner ..................... B60R 1/00
                                                                348/148
2003/0194211 A1 * 10/2003 Abecassis ............ G11B 27/105
                                                                348/E7.071
(Continued)

FOREIGN PATENT DOCUMENTS

JP    2010-028537    2/2010
JP    2018-082391    5/2018

OTHER PUBLICATIONS

International Search Report and Written Opinion for International Application No. PCT/JP2019/044553 dated Feb. 4, 2020, 7 pages.
(Continued)

*Primary Examiner* — Thai Q Tran
*Assistant Examiner* — Nienru Yang
(74) *Attorney, Agent, or Firm* — AMIN, TUROCY & WATSON, LLP

(57) ABSTRACT

A record-and-replay control device includes a video data acquiring unit, an event detecting unit, a replay control unit, an event detection direction acquiring unit, a recording control unit, and a display control unit. The video data acquiring unit is configured to acquire video data from an imaging unit to capture an image of outside of a vehicle. The event detecting unit is configured to detect an event of the vehicle. The event detection direction acquiring unit is configured to acquire an event detection direction of the vehicle. The recording control unit is configured to store video data caused by the detected event as event recording data with a first angle of view. The replay control unit is configured to replay the event recording data. The display
(Continued)

control unit is configured to display the event recording data by adopting a second angle of view with enlargement in the event detection direction.

11 Claims, 16 Drawing Sheets

(51) Int. Cl.
*H04N 7/18* (2006.01)
*H04N 9/87* (2006.01)

(58) Field of Classification Search
CPC .......... H04N 5/77; H04N 7/183; H04N 5/772; H04N 9/8205
USPC ......................................................... 386/228
See application file for complete search history.

(56) References Cited

U.S. PATENT DOCUMENTS

| | | | |
|---|---|---|---|
| 2010/0134264 A1* | 6/2010 | Nagamine | B60Q 9/005 348/113 |
| 2013/0261880 A1* | 10/2013 | Cho | G07C 5/0866 701/32.4 |
| 2019/0222809 A1 | 7/2019 | Murata et al. | |

OTHER PUBLICATIONS

European Office Action for European Patent Application No. 19916774.3 dated Nov. 10, 2022.

\* cited by examiner

RECORD-AND-REPLAY CONTROL DEVICE, REPLAY CONTROL DEVICE, AND RECORD-AND-REPLAY CONTROL METHOD

CROSS-REFERENCE TO RELATED APPLICATION

This application is a Continuation of PCT International Application No. PCT/JP2019/044553 filed on Nov. 13, 2019 which claims the benefit of priority from Japanese Patent Applications No. 2019-033330 and No. 2019-033344, both filed on Feb. 26, 2019, the entire contents of all of which are incorporated herein by reference.

BACKGROUND

1. Technical Field

The present invention relates to a record-and-replay control device, a replay control device, and a record-and-replay control method.

2. Description of the Related Art

An on-vehicle record-and-replay device that detects an event with respect to a vehicle, records video data, and replays the recorded video data to make it possible to check an event status has been known (for example, see JP-A-2018-082391).

To capture an image in a wide range around the vehicle, the video data in which an event is recorded is captured with a 100-degree angle of view or larger in a horizontal direction or a 360-degree angle of view around the vehicle. When the video data that is captured with a wide field of view is replayed and displayed, a captured object that appears in the video data is displayed in a small size, and therefore, in some cases, it may be difficult to appropriately check an event status. As described above, there is room for improvement in checking the event status.

SUMMARY

A record-and-replay control device according to an embodiment includes a video data acquiring unit, an event detecting unit, a replay control unit, an event detection direction acquiring unit, a recording control unit, and a display control unit. The video data acquiring unit is configured to acquire video data captured by an imaging unit configured to capture an image of outside of a vehicle. The event detecting unit is configured to detect an event with respect to the vehicle. The event detection direction acquiring unit is configured to acquire an event detection direction with respect to the vehicle. The recording control unit is configured to, when the event detecting unit detects an event, store video data caused by the detected event as event recording data that is captured by the imaging unit with a first angle of view. The replay control unit is configured to replay the event recording data stored in the recording control unit. The display control unit is configured to cause a display unit to display the event recording data replayed by the replay control unit, by adopting a second angle of view with enlargement in the event detection direction acquired by the event detection direction acquiring unit.

A replay control device according to an embodiment includes a replay control unit and a display control unit. The replay control unit is configured to acquire event recording data and information indicating an event detection direction of the event recording data, and replay the event recording data, the event recording data being based on video data captured by an imaging unit configured to capture an image of outside of a vehicle on the basis of an event that has occurred on the vehicle. The display control unit is configured to display the event recording data replayed by the replay control unit, by adopting the second angle of view with enlargement in the event detection direction on the basis of the information indicating the event detection direction.

A record-and-replay control method according to an embodiment includes acquiring video data captured by an imaging unit configured to capture an image of outside of a vehicle; detecting an event with respect to the vehicle; acquiring an event detection direction of the detected event; storing, when the event is detected, video data caused by the detected event as event recording data that is captured by the imaging unit with a first angle of view; replaying the stored event recording data; and causing a display unit to display the replayed event recording data by adopting a second angle of view with enlargement in the acquired event detection direction.

DETAILED DESCRIPTION

Embodiments of a record-and-replay control device, a replay control device, a record-and-replay control method, and a program will be described below with reference to the accompanying drawings. The present invention is not limited by the embodiments below.

First Embodiment

Figure 1:
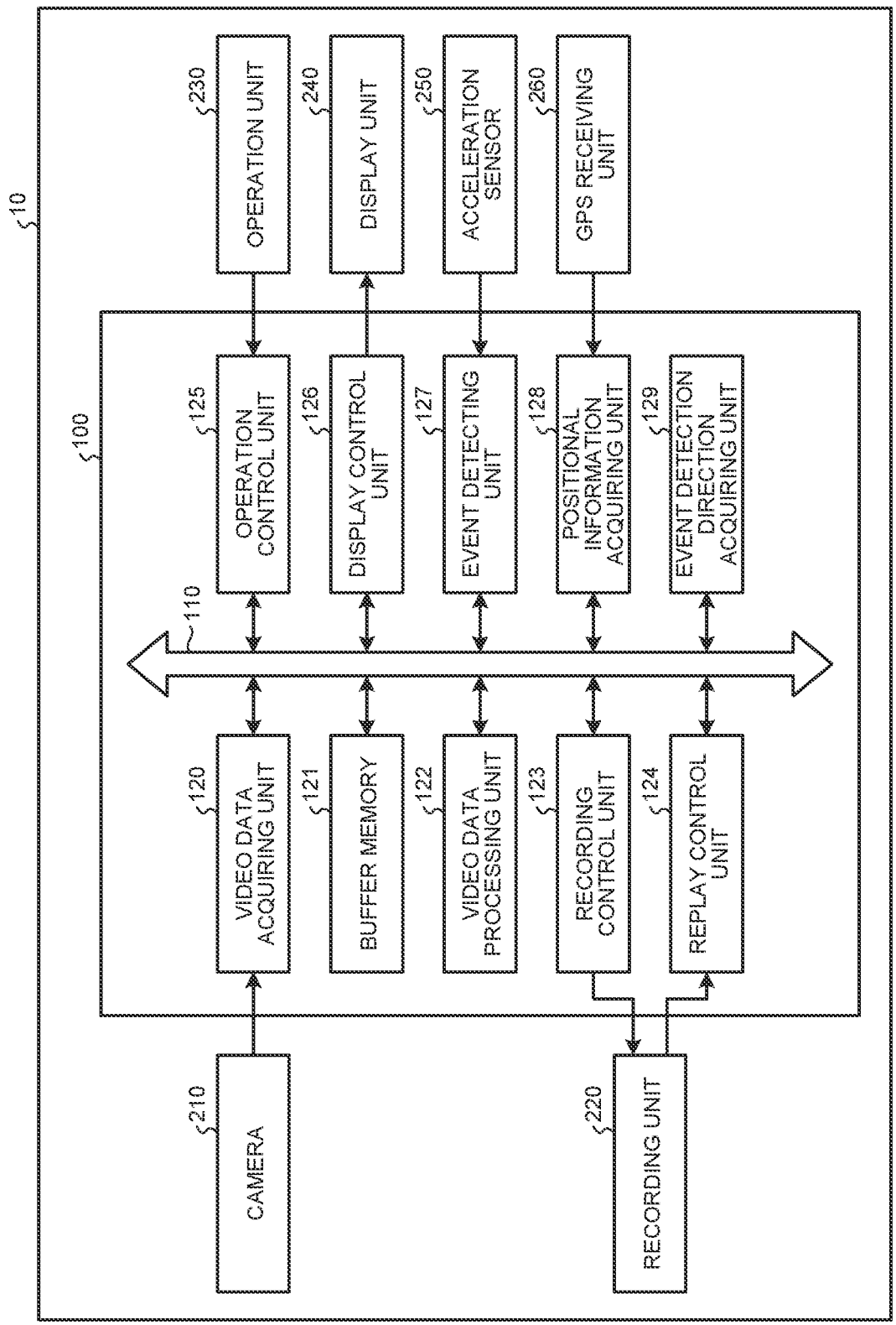
FIG. 1 is a block diagram illustrating a configuration example of an on-vehicle record-and-replay device including a record-and-replay control device according to a first embodiment.
Figure 2:
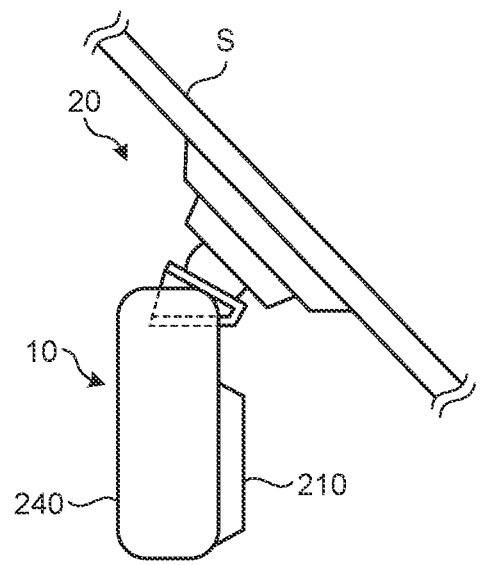
FIG. 2 is a side view of the on-vehicle record-and-replay device.
Figure 3:
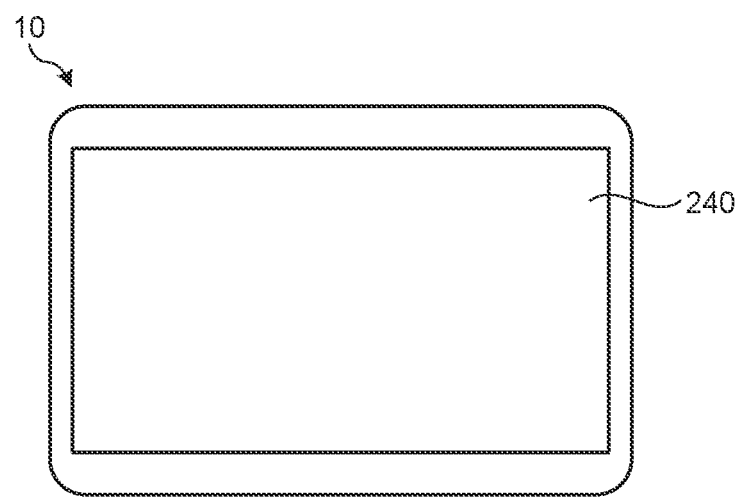
FIG. 3 is a front view of the on-vehicle record-and-replay device.

FIG. 1 is a block diagram illustrating a configuration example of an on-vehicle record-and-replay device including a record-and-replay control device according to a first embodiment. FIG. 2 is a side view of the on-vehicle record-and-replay device. FIG. 3 is a front view of the on-vehicle record-and-replay device. An on-vehicle record-and-replay device 10 displays event recording data in which an event is recorded with a first angle of view, by adopting a second angle of view that is narrower than the first angle of view, with enlargement in an event detection direction.

The on-vehicle record-and-replay device 10 is what is called a drive recorder, and may be a portable device that is available in a vehicle as well as a device that is mounted on a vehicle. In the present embodiment, as illustrated in FIG. 2, the on-vehicle record-and-replay device 10 is fixed to a windshield S via a bracket 20. The on-vehicle record-and-replay device 10 includes a camera (imaging unit) 210, a recording unit 220, an operation unit 230, a display unit 240, an acceleration sensor 250, a global positioning system (GPS) receiving unit 260, and a record-and-replay control device 100.

The camera 210 is a camera that captures an image of outside of the vehicle. In the present embodiment, explanation will be given based on the assumption that the camera 210 is able to capture images in a range from about 100 degrees or larger to about 130 degrees or smaller in a horizontal direction and in a range from about 55 degrees or larger to about 75 degrees or smaller in a vertical direction; however, embodiments are not limited to this example, and it may be possible to adopt a camera that is able to capture a 360-degree spherical image or a plurality of cameras that capture images in different directions. As illustrated in FIG. 2, the camera 210 is arranged on a front part inside the vehicle, for example. The camera 210 continuously captures videos during a period from start to stop of an engine, that is, during a period in which the vehicle operates. In the present embodiment, the camera 210 continuously captures videos while an accessory power supply of the vehicle is turned on. In the present embodiment, when the accessory power supply is turned off, in other words, when the vehicle is stopped, and if an event is detected, the camera 210 starts to capture videos. The camera 210 outputs captured video data to a video data acquiring unit 120 of the record-and-replay control device 100. The video data is a moving image formed of images at 30 frames per second, for example. An angle of view of the captured video data is referred to as the first angle of view.

The recording unit 220 is used to temporarily store data of the on-vehicle record-and-replay device 10. The recording unit 220 is, for example, a semiconductor memory device, such as a random access memory (RAM) or a flash memory, or a recording unit, such as a memory card. Alternatively, an external recording unit that is wirelessly connected via a communication device (not illustrated) may be adopted. The recording unit 220 records event recording data or loop recording data on the basis of a control signal that is output from a recording control unit 123 of the record-and-replay control device 100.

The operation unit 230 is able to receive various kinds of operation on the on-vehicle record-and-replay device 10. For example, the operation unit 230 is able to receive operation of manually storing captured video data in the recording unit 220. For example, the operation unit 230 is able to receive operation of replaying the event recording data or the loop recording data recorded in the recording unit 220. For example, the operation unit 230 is able to receive operation of deleting the event recording data recorded in the recording unit 220. For example, the operation unit 230 is able to receive operation of terminating loop recording. The operation unit 230 outputs operation information to an operation control unit 125 of the record-and-replay control device 100.

The operation unit 230 is a touch panel included in the display unit 240, and, with respect to operation of replaying a piece of event recording data stored in the recording unit 220, issues instructions to select and replay the piece of event recording data when a list of pieces of event recording data or the like displayed on the display unit 240 is touched. The list of the pieces of event recording data is displayed as thumbnails or the like.

The display unit 240 is, as one example, a display device that is unique to the on-vehicle record-and-replay device 10 or a display device that is shared with other systems including a navigation system. The display unit 240 is, for example, a display including a liquid crystal display (LCD), an organic electro-luminescence (EL) display, or the like. In the present embodiment, as illustrated in FIG. 2 and FIG. 3, the display unit 240 is integrated with the camera 210. The display unit 240 displays a video on the basis of a video signal that is output from a display control unit 126 of the record-and-replay control device 100. The display unit 240 displays a video captured by the camera 210 or a video recorded in the recording unit 220.

The acceleration sensor 250 is a sensor that detects acceleration applied to the vehicle. The acceleration sensor 250 outputs a detection result to an event detecting unit 127 of the record-and-replay control device 100. The acceleration sensor 250 is a sensor that detects acceleration in three-axis directions, for example. The three-axis directions include a front-back direction, a left-right direction, and a vertical direction of the vehicle. With the acceleration in the three-axis directions, it is possible to detect a shock applied to the vehicle.

The GPS receiving unit 260 receives radio waves from GPS satellites (not illustrated). The GPS receiving unit 260 outputs the received radio signal to a positional information acquiring unit 128 of the record-and-replay control device 100.

The record-and-replay control device 100 is an arithmetic processing device (control device) including a central processing unit (CPU), for example. The record-and-replay control device 100 loads a stored program onto a memory and executes a command included in the program. The record-and-replay control device 100 includes an internal memory (not illustrated), and the internal memory is used to temporarily store data of the record-and-replay control device 100. The record-and-replay control device 100 includes the video data acquiring unit 120, a buffer memory 121, a video data processing unit 122, the recording control unit 123, a replay control unit 124, the operation control unit 125, the display control unit 126, the event detecting unit 127, the positional information acquiring unit 128, and an event detection direction acquiring unit 129, all of which are connected to a bus 110.

The video data acquiring unit 120 acquires video data that is obtained by capturing an image around the vehicle. More specifically, the video data acquiring unit 120 acquires video data that is output by the camera 210.

The buffer memory 121 is an internal memory included in the record-and-replay control device 100, and is a memory for temporarily storing video data that corresponds to a predetermined time period and that is acquired by the video data acquiring unit 120, while updating the video data.

The video data processing unit 122 converts the video data, which is temporarily stored in the buffer memory 121, to an arbitrary file format, such as an MP4 format, which is coded by codec of an arbitrary method, such as H.264 or moving picture experts group (MPEG)-4. The video data processing unit 122 generates video data as a file for a predetermined time period, from the video data that is temporarily stored in the buffer memory 121. Specifically, the video data processing unit 122 generates, as a single file, video data for 60 seconds in order of recording from the video data that is temporarily stored in the buffer memory 121. The video data processing unit 122 outputs the generated video data to the recording control unit 123. Further, the video data processing unit 122 outputs the generated video data to the display control unit 126. The period of the video data generated as a file is set to, as one example, 60 seconds, but embodiments are not limited to this example. The video data described herein may be data including voice in addition to a video captured by the camera 210.

The recording control unit 123 causes the recording unit 220 to record the video data that is generated as a file by the video data processing unit 122. During a period in which a loop recording process is performed, e.g., when the accessory power supply of the vehicle is turned on, the recording control unit 123 records, as rewritable video data, the video data that is generated as a file by the video data processing unit 122, in the recording unit 220. More specifically, during the period in which the loop recording process is performed, the recording control unit 123 continuously records the video data generated by the video data processing unit 122, and if the capacity of the recording unit 220 is fully used, the recording control unit 123 records new video data by overwriting the oldest video data.

Furthermore, if the event detecting unit 127 detects an event, the recording control unit 123 stores, in the recording unit 220, video data corresponding to a predetermined period in the video data generated by the video data processing unit 122, as event recording data for which overwriting is inhibited.

Moreover, if the event detecting unit 127 detects an event, the recording control unit 123 stores video data caused by the detected event as the event recording data that is captured by the camera 210 with the first angle of view. Furthermore, if the recording control unit 123 acquires, from the event detection direction acquiring unit 129, information indicating an event detection direction corresponding to a target event whose video data is recorded as the event recording data, the recording control unit 123 records the event recording data and the information indicating the event detection direction in the recording unit 220 in an associated manner.

During the period in which the loop recording process is performed, the video data caused by the event is video data corresponding to a predetermined period before and after an event detected time point, and an example of the predetermined period is a period of 10 seconds or longer and 60 seconds or shorter before and after the event detected time point. If the loop recording process is not performed and imaging is started after detection of an event, the video data caused by the event is video data corresponding to a period from start of imaging due to the detection of the event to a lapse a predetermined period, and an example of the predetermined period is a period of 10 seconds or longer and 60 seconds or shorter, for example.

The replay control unit 124 replays the selected event recording data or the selected loop recording data. The replay control unit 124 performs control of replaying the event recording data or the loop recording data recorded in the recording unit 220, on the basis of a control signal of selection operation and replay operation output from the operation control unit 125. If the information indicating the event detection direction is associated with the selected event recording data, the replay control unit 124 outputs the information indicating the event detection direction to the display control unit 126.

The operation control unit 125 acquires operation information on operation that is received by the operation unit 230. For example, the operation control unit 125 acquires storage operation information indicating operation of manually storing video data, selection operation information indicating operation of selecting video data, replay operation information indicating operation of replaying video data, or deletion operation information indicating operation of deleting video data, and outputs a control signal. For example, the operation control unit 125 acquires termination operation information indicating operation of terminating loop recording, and outputs a control signal.

The display control unit 126 controls display of video data on the display unit 240. The display control unit 126 outputs a video signal for causing the display unit 240 to output video data. More specifically, the display control unit 126 causes the display unit 240 to display, with the first angle of view, a video that is captured by the camera 210 or the event recording data or the loop recording data that is recorded in the recording unit 220 and that is replayed by the replay control unit 124.

If the event recording data includes the information indicating the event detection direction detected by the event detection direction acquiring unit 129, the display control unit 126 causes the display unit 240 to display the event recording data replayed by the replay control unit 124, by adopting a second angle of view with enlargement in the event detection direction detected by the event detection direction acquiring unit 129.

For example, the second angle of view is equal to or smaller than about 90 degrees in the horizontal direction, and equal to or smaller than about 50 degrees in the vertical direction. The event recording data with the second angle of view and the event recording data with the first angle of view have differences in the angle of view to the extent that a user can recognize the differences. A position of a central point of the event recording data with the second angle of view in the left-right direction is shifted in a rightward direction or a leftward direction, which is the event detection direction, with respect to the event recording data with the first angle of view. A position of a central point of the event recording data with the second angle of view in the vertical direction may be the same or may be shifted in an upward direction or a downward direction with respect to the event recording data with the first angle of view. The event recording data with the second angle of view and the event recording data with the first angle of view may be set such that, for example, a height of a vanishing point, a height of the horizon, or a height of a reference object, such as a part of a building or a guardrail, that appears in images is not changed.

Furthermore, if the event recording data is replayed within a first predetermined period since storage of the event recording data, the display control unit 126 may display the event recording data by adopting the second angle of view with enlargement in the event detection direction detected by the event detection direction acquiring unit 129. The first predetermined period is, for example, a period, such as about a few minutes, that corresponds to a case in which the event recording data is replayed and checked immediately after occurrence of the event. If the event recording data is replayed after a lapse of the first predetermined period since storage of the event recording data, the display control unit 126 displays the event recording data with the first angle of view without enlargement.

Figure 4:
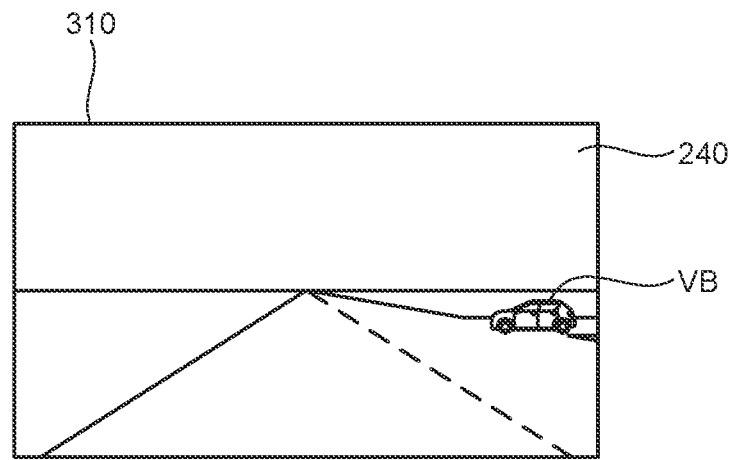
FIG. 4 is a diagram illustrating an example of event recording data display on a display unit.

Event recording data 310 that is displayed on the display unit 240 by the display control unit 126 when the event detection direction is not acquired will be described below with reference to FIG. 4. FIG. 4 is a diagram illustrating an example of the event recording data displayed on the display unit 240. When the event recording data 310 that is not associated with the event detection direction is replayed, the display control unit 126 causes the display unit 240 to display the event recording data 310 with the first angle of view.

Figure 5:
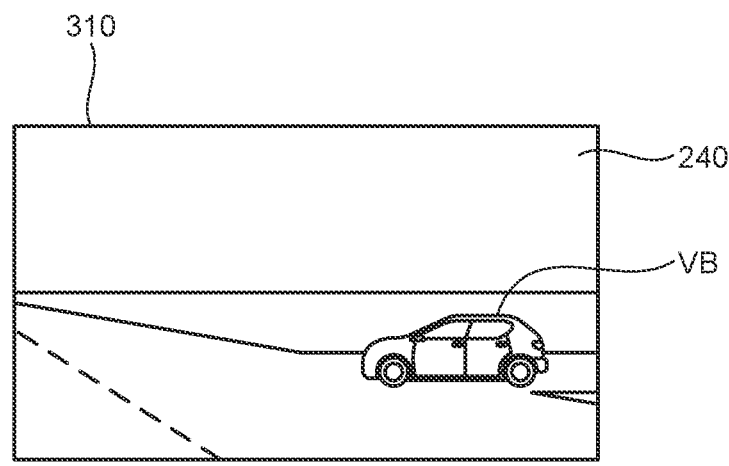
FIG. 5 is a diagram illustrating another example of the event recording data displayed on the display unit.

The event recording data 310 that is displayed on the display unit 240 by the display control unit 126 when the event detection direction is acquired will be described below with reference to FIG. 5. FIG. 5 is a diagram illustrating an example of the event recording data displayed on the display unit. The display control unit 126 causes the display unit 240 to display the event recording data 310 associated with the event detection direction, by adopting the second angle of view with enlargement in the event detection direction. The event recording data 310 in FIG. 5 is displayed with a narrower angle of view than the event recording data 310 in FIG. 4.

The event detecting unit 127 detects an event with respect to the vehicle. The event detecting unit 127 may adopt an arbitrary method for detecting an even related to the vehicle; for example, the event detecting unit 127 detects an event on the basis of the detection result of the acceleration sensor 250. In this case, if acceleration equal to or larger than a threshold is detected in the acceleration that has been detected by the acceleration sensor 250, the event detecting unit 127 detects the acceleration as an event. As for the acceleration that is detected as an event by the event detecting unit 127, a threshold is set such that a shock applied to the vehicle is detected.

The positional information acquiring unit 128 calculates, by a well-known method, current positional information on the vehicle on the basis of radio waves that are received by the GPS receiving unit 260. If the event detecting unit 127 detects an event, the positional information calculated by the positional information acquiring unit 128 is stored together with the event recording data.

If the event detecting unit 127 detects an event, the event detection direction acquiring unit 129 acquires the event detection direction with respect to the vehicle.

Figure 6:
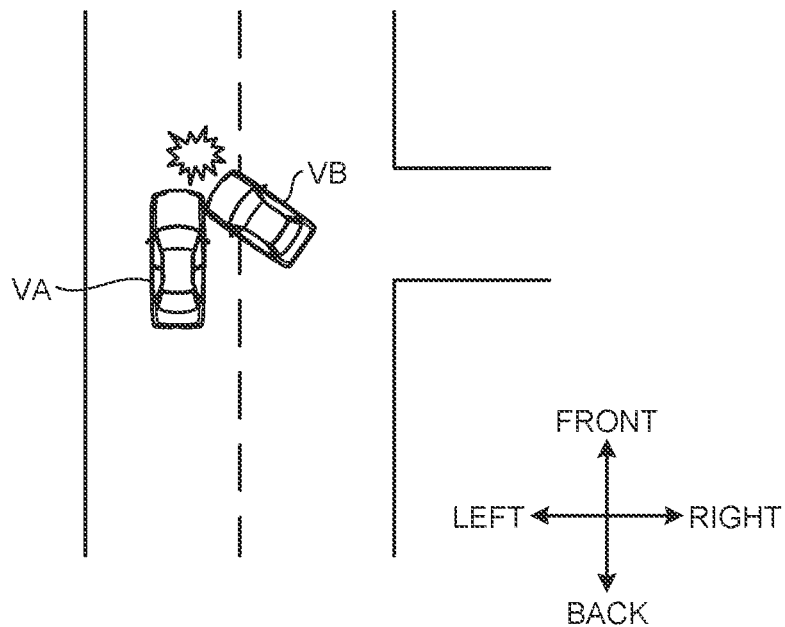
FIG. 6 is a diagram for explaining an event detection direction.
Figure 7:
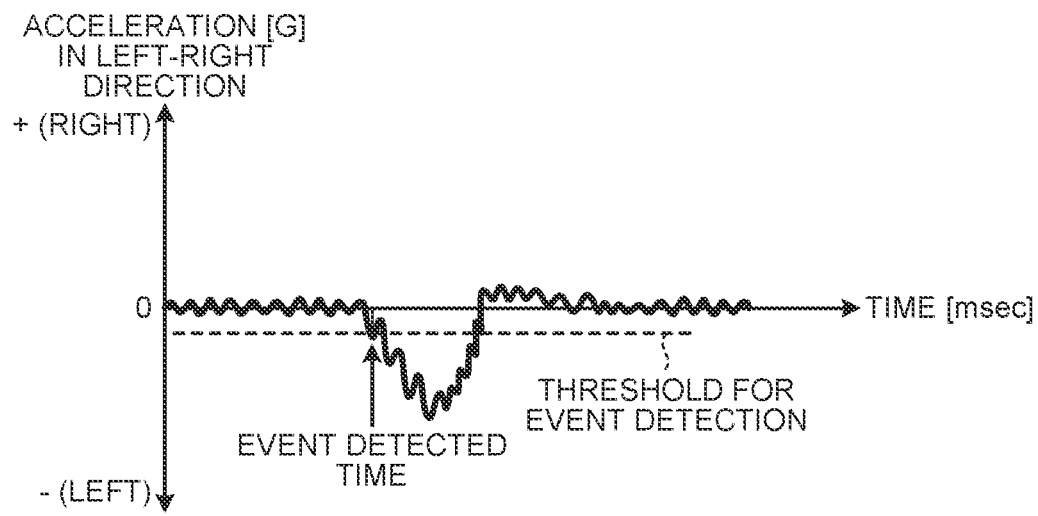
FIG. 7 is a diagram for explaining the event detection direction, and is a diagram illustrating a detection result of an acceleration sensor before and after an event detected time point.
Figure 8:
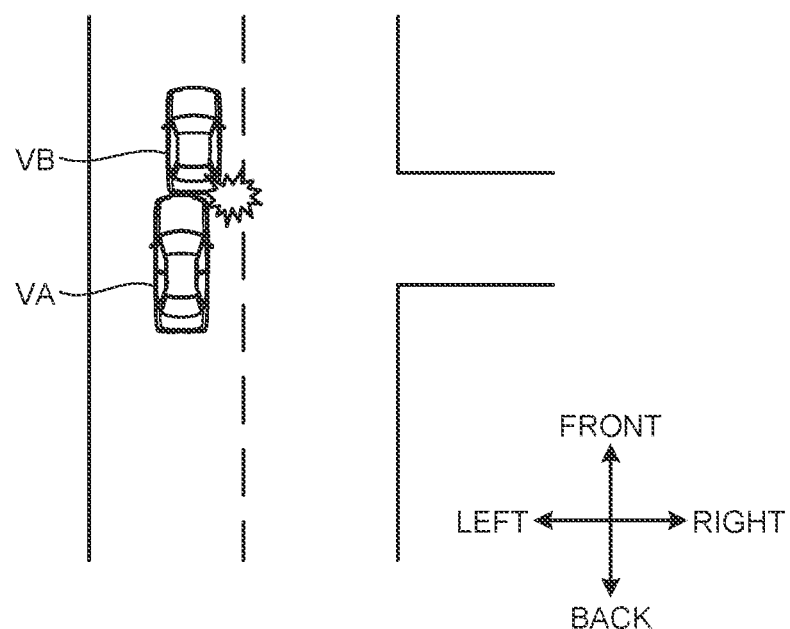
FIG. 8 is a diagram for explaining the event detection direction.

The event detection direction will be described with reference to FIG. 6 to FIG. 8. FIG. 6 is a diagram for explaining the event detection direction. FIG. 7 is a diagram for explaining the event detection direction, and is a diagram illustrating a detection result of the acceleration sensor before and after the event detected time point. FIG. 8 is a diagram for explaining the event detection direction. For example, as illustrated in FIG. 6, a case will be described in which a different vehicle VB crashes into a right side of a subject vehicle VA that is moving straight. The subject vehicle VA that is crashed into by the different vehicle VB from the right side is pushed to the left side. As illustrated in FIG. 7, as for acceleration that acts on the subject vehicle VA in the left-right direction, if it is assumed that acceleration that is applied in a rightward direction of the vehicle around the event detected time point is acceleration in a positive direction, acceleration in a negative direction, in other words, acceleration in a leftward direction increases. Therefore, it is found that an object, such as the different vehicle VB, crashes in the rightward direction of the subject vehicle VA. The event detection direction in this case is the rightward direction. Furthermore, for example, as illustrated in FIG. 8, a case will be described in which the different vehicle VB crashes into a front right side of the subject vehicle VA. In this case, acceleration in the leftward direction increases as the acceleration that acts on the subject vehicle VA in the left-right direction, so that the event detection direction is the rightward direction.

Figure 9:
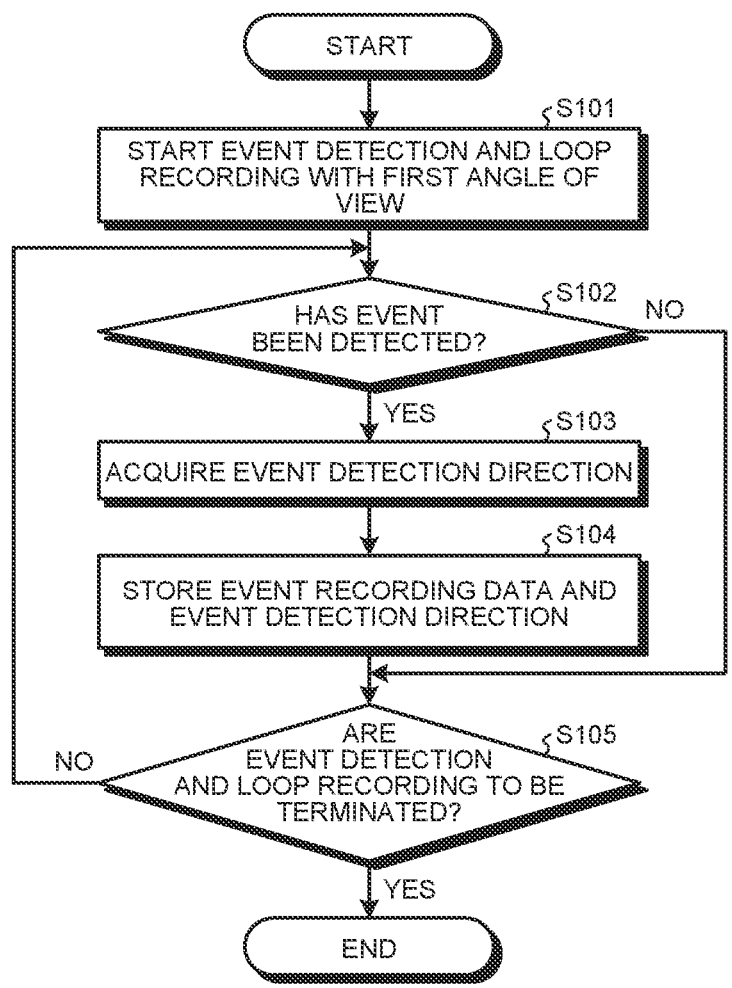
FIG. 9 is a flowchart illustrating the flow of a record process in the record-and-replay control device according to the first embodiment.

Next, a flow of a record process in the record-and-replay control device 100 will be described with reference to FIG. 9. FIG. 9 is a flowchart illustrating the flow of the record process in the record-and-replay control device according to the first embodiment. Here, a case will be described in which the loop recording process is performed.

The record-and-replay control device 100 starts event detection and loop recording with the first angle of view (Step S101). More specifically, the record-and-replay control device 100 causes the event detecting unit 127 to detect an event on the basis of the detection result of the acceleration sensor 250. The record-and-replay control device 100 causes the video data processing unit 122 to generate loop recording video data for each video corresponding to a predetermined period from the video data recorded in the buffer memory 121. The record-and-replay control device 100 causes the recording control unit 123 to record the loop recording video data in the recording unit 220. The record-and-replay control device 100 proceeds to Step S102.

The record-and-replay control device 100 determines whether the event detecting unit 127 has detected an event (Step S102). More specifically, if the event detecting unit 127 has detected an event (Yes at Step S102), the record-and-replay control device 100 proceeds to Step S103. If the event detecting unit 127 has not detected an event (No at Step S102), the record-and-replay control device 100 proceeds to proceed to Step S105.

If the event has been detected (Yes at Step S102), the record-and-replay control device 100 causes the event detection direction acquiring unit 129 to acquire the event detection direction (Step S103). The record-and-replay control device 100 proceeds to Step S104.

The record-and-replay control device 100 stores the event recording data, which is video data before and after the event detection, and the event detection direction (Step S104). More specifically, the record-and-replay control device 100 causes the video data processing unit 122 to generate, as the event recording data, video data including at least an event occurrence time, from the loop recording video data recorded in the recording unit 220. The record-and-replay control device 100 causes the recording control unit 123 to store the event recording data in the recording unit 220. The record-and-replay control device 100 stores the information indicating the event detection direction together with the event recording data. The record-and-replay control device 100 proceeds to Step S105. At Step S103, even though the event is detected, if the event detection direction is not acquired, the event detection direction is not acquired and only the event recording data is stored at Step S104.

The record-and-replay control device 100 determines whether the event detection and the loop recording are to be terminated (Step S105). More specifically, the record-and-replay control device 100 determines that the event detection and the loop recording are to be terminated under an arbitrary condition, such as output of the termination operation information by the operation control unit 125 or termination of the operation of the vehicle (Yes at Step S105), and terminates the process. The record-and-replay control device 100 determines that the event detection and the loop recording are not to be terminated if the termination operation information is not output by the operation control unit 125 (No at Step S105), and performs the process at Step S102 again.

Figure 10:
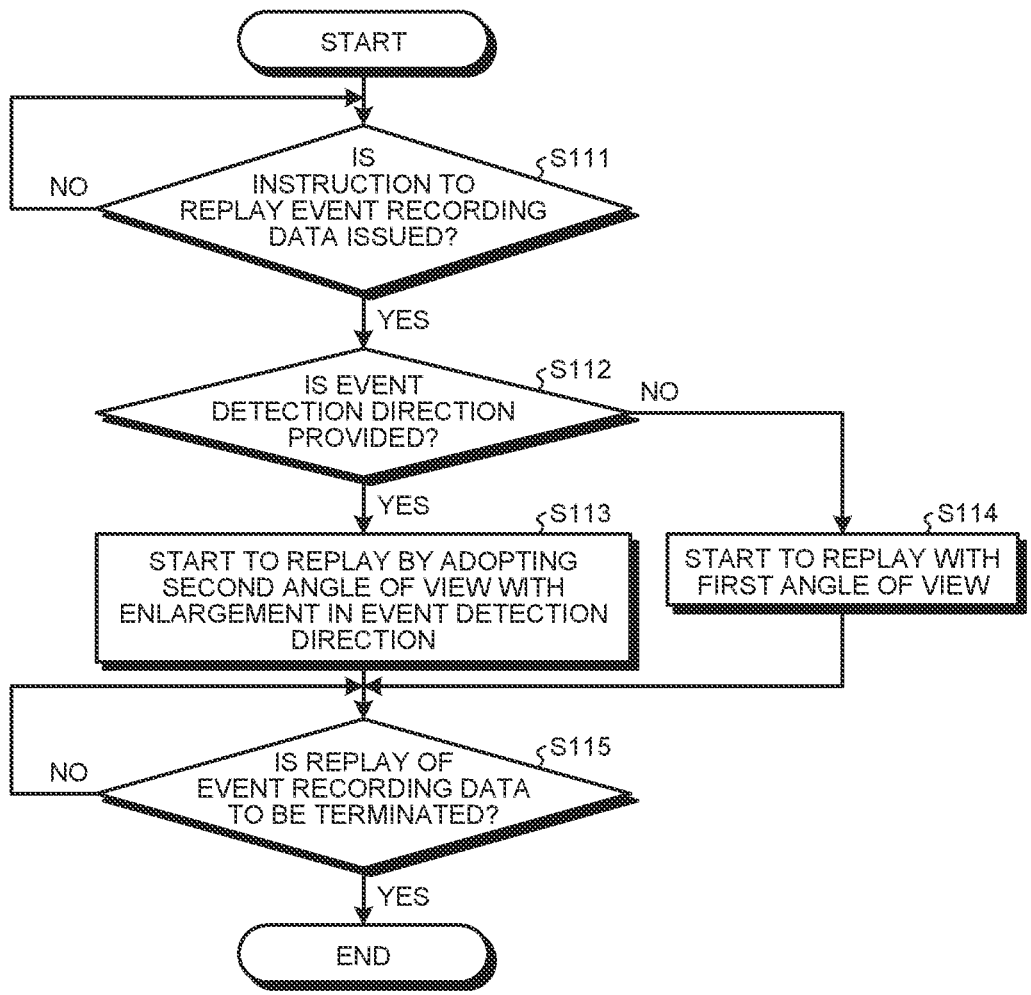
FIG. 10 is a flowchart illustrating the flow of a replay process in the record-and-replay control device according to the first embodiment.

Next, the flow of the replay process in the record-and-replay control device 100 will be described with reference to FIG. 10. FIG. 10 is a flowchart illustrating the flow of the replay process in the record-and-replay control device 100 according to the first embodiment.

The record-and-replay control device 100 determines whether an instruction to replay the event recording data is issued (Step S111). If the operation control unit 125 acquires operation information indicating the instruction to replay the event recording data, the record-and-replay control device 100 determines that the instruction to replay the event recording data is issued (Yes at Step S111), and proceeds to Step S112. If the operation control unit 125 does not acquire the operation information indicating the instruction to replay the event recording data, the record-and-replay control device 100 determines that the instruction to replay the event recording data is not issued (No at Step S111), and may perform the process at Step S111 again or terminate the process.

If it is determined that the instruction to replay the event recording data is issued (Yes at Step S111), the record-and-replay control device 100 determines whether the event detection direction is provided (Step S112). More specifically, if the information indicating the event detection direction is stored together with the event recording data that is to be replayed, the record-and-replay control device 100 determines that the event detection direction is provided (Yes at Step S112), and proceeds to Step S113. If the information indicating the event detection direction is not stored together with the event recording data that is to be replayed, the record-and-replay control device 100 determines that the event detection direction is not provided (No at Step S112), and proceeds to Step S114.

If it is determined that the event detection direction is provided (Yes at Step S112), the record-and-replay control device 100 starts to replay the event recording data, and displays the replayed event recording data by adopting the second angle of view with enlargement in the event detection direction (Step S113). The record-and-replay control device 100 proceeds to Step S115.

If it is determined that the event detection direction is not provided (No at Step S112), the record-and-replay control device 100 starts to replay the event recording data, and displays the replayed event recording data with the first angle of view (Step S114). The record-and-replay control device 100 proceeds to Step S115.

The record-and-replay control device 100 determines whether replay of the event recording data is to be terminated (Step S115). If the event recording data is replayed to the end, or if operation of stopping replay is performed, the record-and-replay control device 100 determines that the replay of the event recording data is to be terminated (Yes at Step S115), and terminates the process. In cases other than the above, the record-and-replay control device 100 determines that the replay of the event recording data is not to be terminated (No at Step S115), and performs the process at Step S115 again.

In the process as described above, it may be possible to display the event recording data with the second angle of view only when the event recording data is replayed within the first predetermined period since storage of the event recording data. In this case, after Step S112 and before Step S113, a step of determining whether an elapsed time since storage of the event recording data is within the first predetermined period is added. If it is determined that the elapsed time since storage of the event recording data is within the first predetermined period, the process proceeds to Step S113. If it is determined that the elapsed time since storage of the event recording data is not within the first predetermined period, the process proceeds to Step S114.

Figure 11:
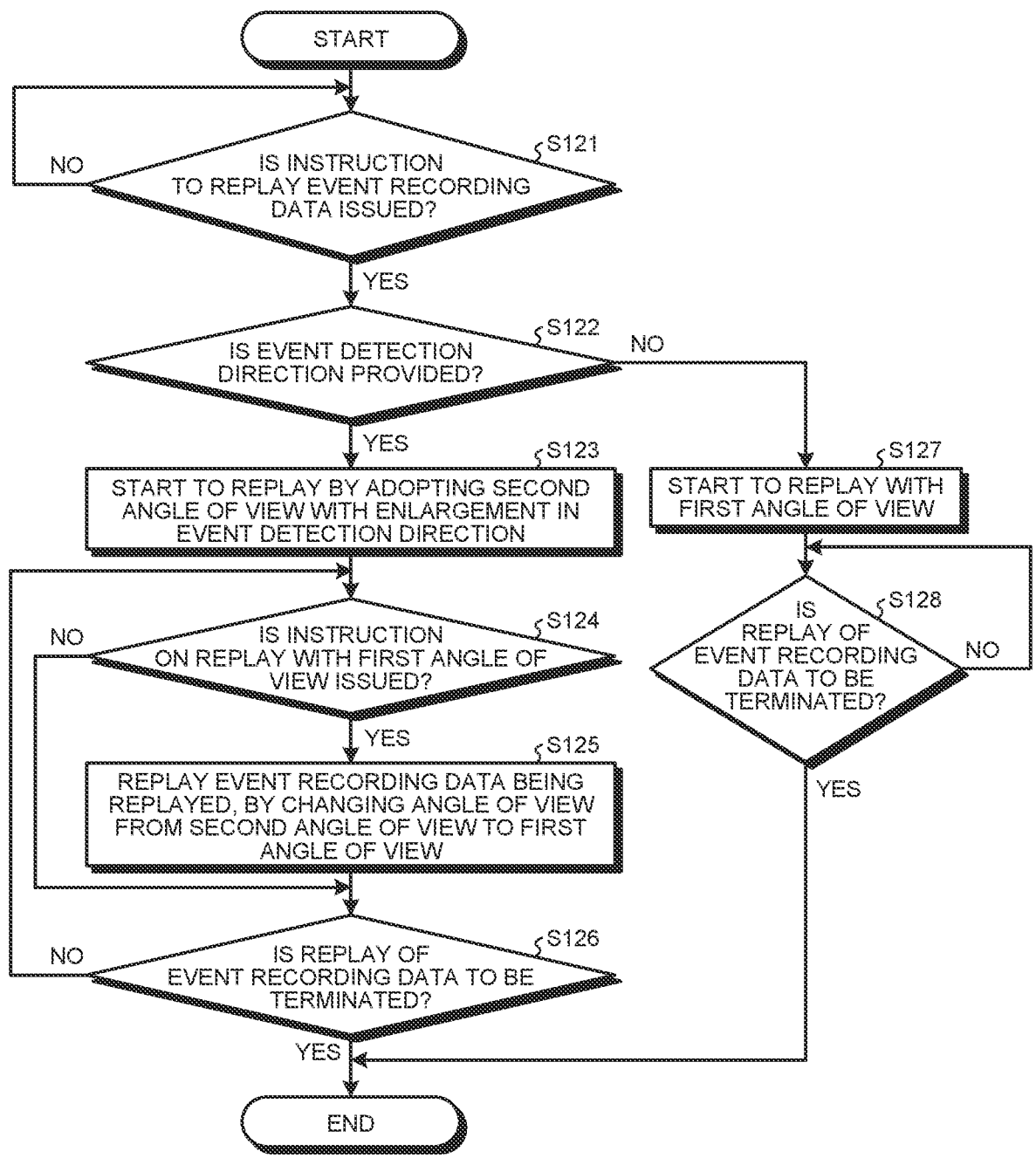
FIG. 11 is a flowchart illustrating another example of the flow of the replay process in the record-and-replay control device according to the first embodiment.

Next, another example of the flow of the replay process in the record-and-replay control device 100 will be described with reference to FIG. 11. FIG. 11 is a flowchart illustrating another example of the flow of the replay process in the record-and-replay control device according to the first embodiment. Processes from Step S121 to Step S123, Step S126, Step S127, and Step S128 are the same as the processes from Step S111 to Step S113, Step S115, Step S114, and Step S115 in the flowchart illustrated in FIG. 10.

The record-and-replay control device 100 determines whether an instruction on replay with the first angle of view is issued (Step S124). If the operation control unit 125 acquires operation information indicating the instruction to replay the event recording data with the first angle of view, the record-and-replay control device 100 determines that the instruction on replay with the first angle of view is issued (Yes at Step S124), and proceeds to Step S125. If the operation control unit 125 does not acquire the operation information indicating the instruction to replay the event recording data with the first angle of view, the record-and-replay control device 100 determines that the instruction on replay with the first angle of view is not issued (No at Step S124), and proceeds to Step S126.

If it is determined that the instruction on replay with the first angle of view is issued (Yes at Step S124), the record-and-replay control device 100 displays the event recording data by changing an angle of view of the replayed event recording data from the second angle of view to the first angle of view (Step S125). The record-and-replay control device 100 proceeds to Step S126.

Figure 12:
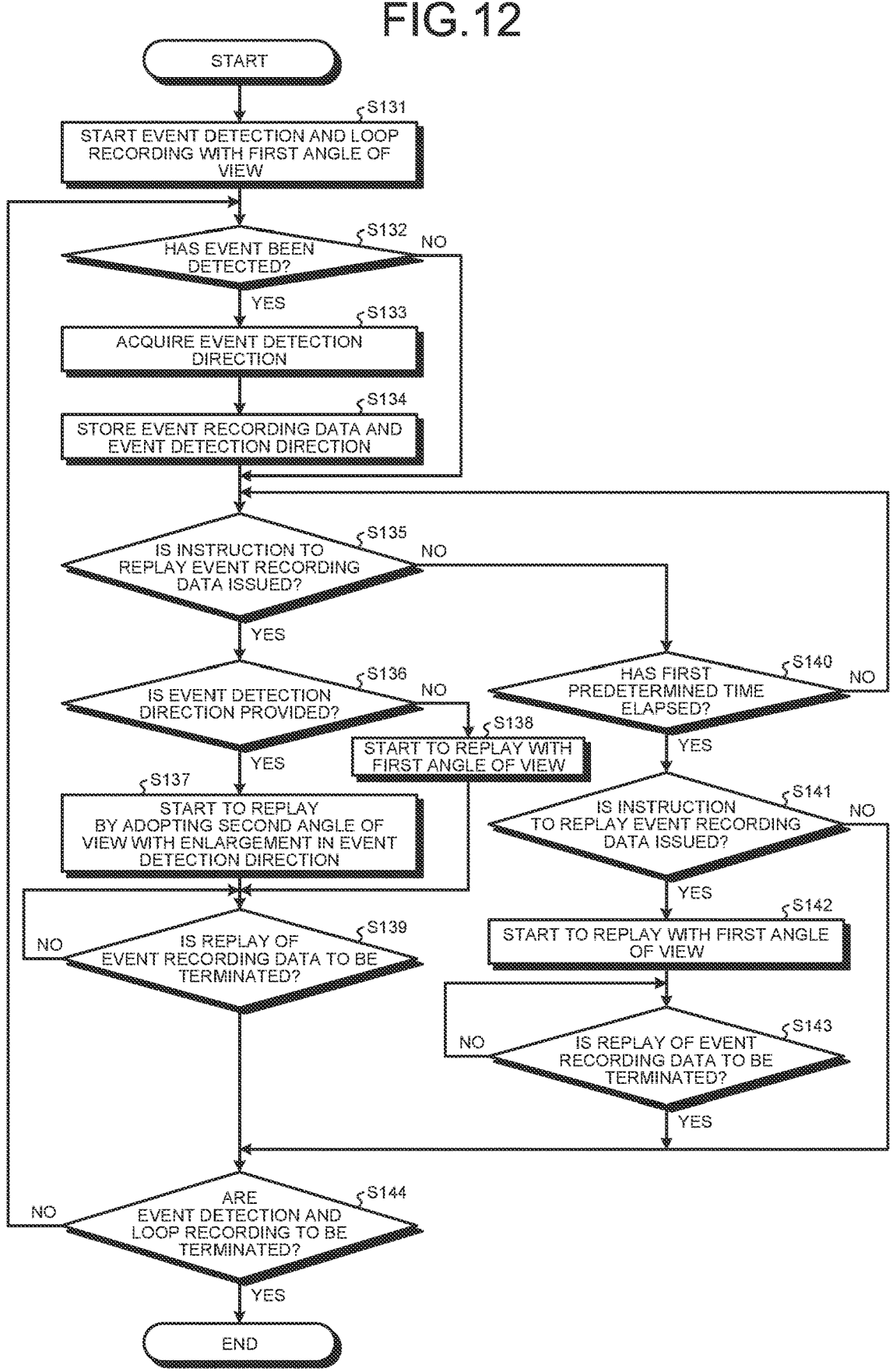
FIG. 12 is a flowchart illustrating another example of the flow of a record-and-replay process in the record-and-replay control device according to the first embodiment.

Next, another example of the flow of the replay process in the record-and-replay control device 100 will be described with reference to FIG. 12. FIG. 12 is a flowchart illustrating another example of the flow of the record-and-replay process in the record-and-replay control device according to the first embodiment. Processes from Step S131 to Step S134, Step S135 to Step S139, Step S141, Step S142, Step S143, and Step S144 are the same as the processes from Step S101 to Step S104, Step S111 to Step S115, Step S111, Step S114, Step S115, and Step S105 in the flowcharts illustrated in FIG. 9 and FIG. 10.

If it is determined that the instruction on replay of the event recording data is not issued (No at Step S135), the record-and-replay control device 100 determines whether the first predetermined period has elapsed since storage of the event recording data (Step S140). If it is determined that the first predetermined period has elapsed since storage of the event recording data (Yes at Step S140), the record-and-replay control device 100 proceeds to Step S141. If it is not determined that the first predetermined period has elapsed since storage of the event recording data (No at Step S140), the record-and-replay control device 100 performs the process at Step S135 again.

In this manner, when the event recording data with the event detection direction is replayed, the event recording data is displayed with the second angle of view with enlargement in the event detection direction on the display unit 240. Further, if the event recording data without the event detection direction is replayed, the event recording data is displayed with the first angle of view on the display unit 240.

As described above, in the present embodiment, when the event recording data with the event detection direction is replayed, the display control unit 126 is able to display the event recording data by adopting the second angle of view with enlargement in the event detection direction on the display unit 240. In the present embodiment, the event recording data with the event detection direction is enlarged in the event detection direction, so that it is possible to easily find a captured object related to the event from the event recording data. In this manner, according to the present embodiment, it is possible to appropriately check the event status.

In the present embodiment, when the event recording data without the event detection direction is replayed, the display control unit 126 is able to display the event recording data with the first angle of view on the display unit 240.

In the present embodiment, if an instruction on replay with the first angle of view is issued while the event recording data is being replayed with the second angle of view, the display control unit 126 is able to display the event recording data with the first angle of view by changing the angle of view from the second angle of view.

In the present embodiment, only when the event recording data is replayed within the first predetermined period since storage of the event recording data, the display control unit 126 is able to display the replayed event recording data with the second angle of view on the display unit 240. Therefore, according to the present invention, it is possible to display, with the second angle of view, only new event recording data for which an elapsed time since event detection is relatively short.

Second Embodiment

Figure 13:
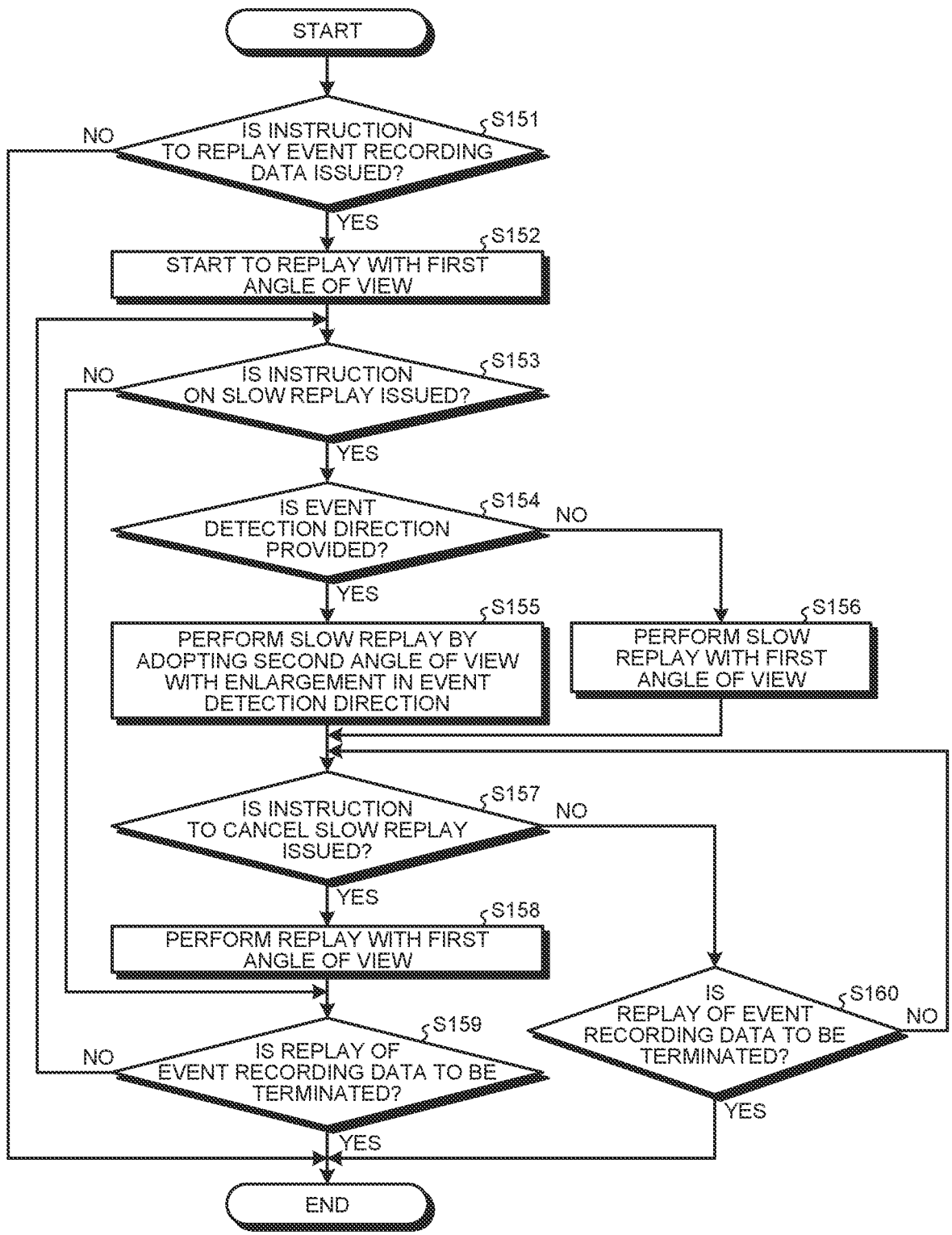
FIG. 13 is a flowchart illustrating the flow of a replay process in a record-and-replay control device according to a second embodiment.

An on-vehicle record-and-replay device 10 according to a second embodiment will be described with reference to FIG. 13. FIG. 13 is a flowchart illustrating the flow of a replay process in a record-and-replay control device according to the second embodiment. A basic configuration of the on-vehicle record-and-replay device 10 is the same as the on-vehicle record-and-replay device 10 of the first embodiment. In the following description, the same components as those of the on-vehicle record-and-replay device 10 are denoted by the same reference symbols or corresponding reference symbols, and detailed explanation thereof will be omitted. The on-vehicle record-and-replay device 10 is different from the first embodiment in that the operation control unit 125 and the display control unit 126 perform different processes.

The operation control unit 125 acquires slow replay operation information indicating operation of slowly replaying video data and cancel operation information indicating operation of cancelling slow replay, and outputs a control signal.

If the control signal acquired from the operation control unit 125 indicates an instruction on slow replay for the event recording data that is replayed and displayed with the first angle of view, the display control unit 126 displays the event recording data with the second angle of view.

Next, the flow of a process in the record-and-replay control device 100 will be described with reference to FIG. 13. Processes at Step S151, Step S152, Step S154, Step S159, and Step S160 are the same as the processes at Step S111, Step S114, Step S112, Step S115, and Step S115 in the flowchart illustrated in FIG. 10.

The record-and-replay control device 100 determines whether the instruction on slow replay is issued (Step S153). If the record-and-replay control device 100 determines that the instruction on slow replay is issued (Yes at Step S153), the process proceeds to Step S154. If the record-and-replay control device 100 does not determine that the instruction on slow replay is issued (No at Step S153), the process proceeds to Step S159.

If it is determined that the event detection direction is provided (Yes at Step S154), the record-and-replay control device 100 performs slow replay of the event recording data and displays the event recording data by adopting the second angle of view with enlargement in the event detection direction (Step S155). The record-and-replay control device 100 proceeds to Step S157.

If it is determined that the event detection direction is not provided (No at Step S154), the record-and-replay control device 100 performs slow replay of the event recording data and displays the event recording data with the first angle of view (Step S156). The record-and-replay control device 100 proceeds to Step S157.

The record-and-replay control device 100 determines whether an instruction to cancel the slow replay is issued (Step S157). If the record-and-replay control device 100 determines that the instruction to cancel the slow replay is issued (Yes at Step S157), the process proceeds to Step S158. If the record-and-replay control device 100 does not determine that the instruction to cancel the slow replay is issued (No at Step S157), the process proceeds to Step S160.

If it is determined that the instruction to cancel the slow replay is issued (Yes at Step S157), the record-and-replay control device 100 replays the event recording data at normal speed and displays the event recording data with the first angle of view (Step S158). The record-and-replay control device 100 proceeds to Step S159.

In this manner, if the instruction on slow replay is issued while the event recording data with the event detection direction is being replayed, the event recording data is slowly replayed and displayed with the second angle of view with enlargement in the event detection direction on the display unit 240.

As described above, in the present embodiment, if the instruction on slow replay is issued while the event recording data with the event detection direction is being replayed, the display control unit 126 is able to slowly replay and display the event recording data by adopting the second angle of view with enlargement in the event detection direction on the display unit 240. With this configuration, it is possible to appropriately check a captured object related to the event when it is desired to check the event status using the slow replay.

Third Embodiment

Figure 14:
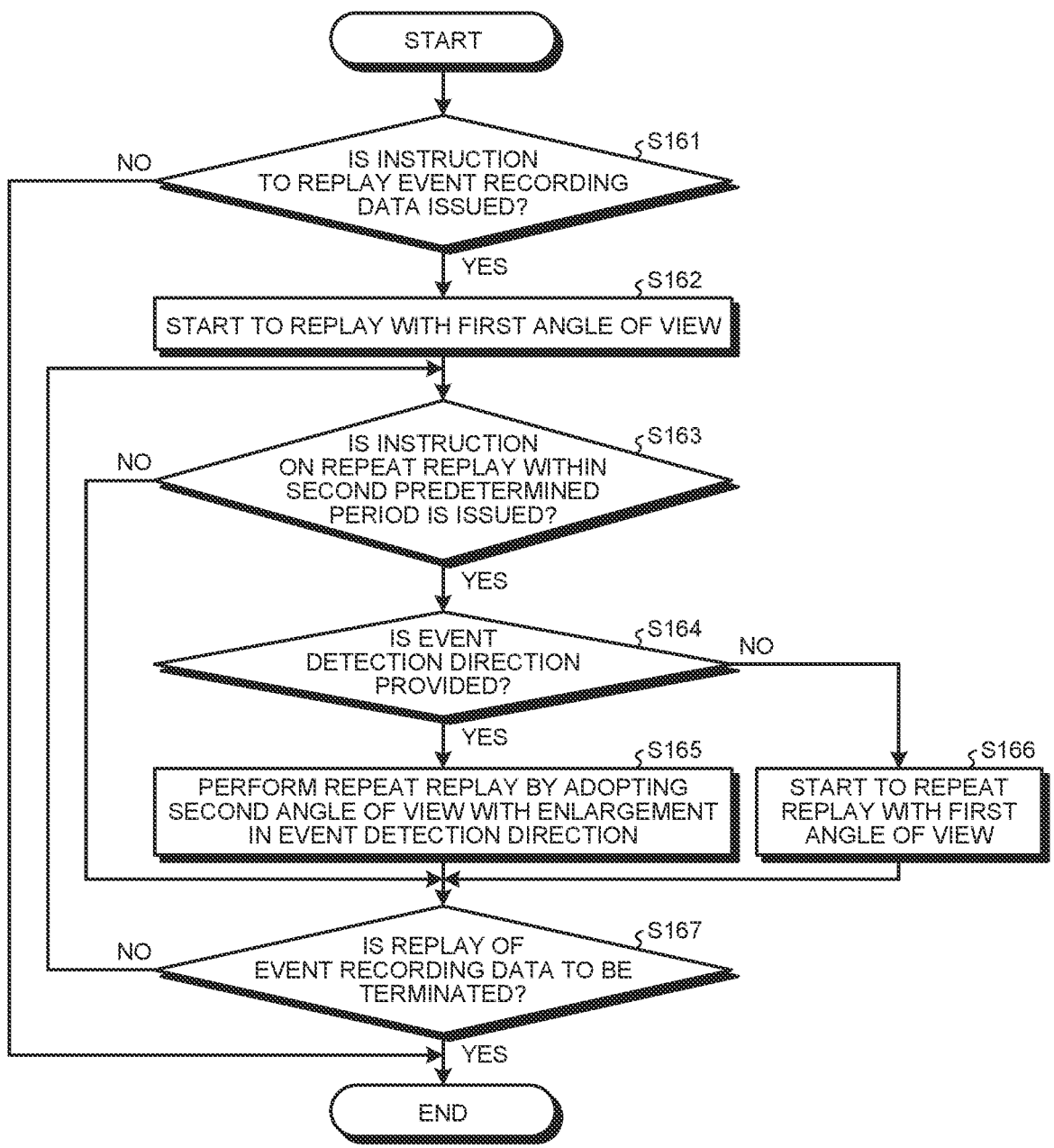
FIG. 14 is a flowchart illustrating the flow of a replay process in a record-and-replay control device according to a third embodiment.

An on-vehicle record-and-replay device 10 according to a third embodiment will be described with reference to FIG. 14. FIG. 14 is a flowchart illustrating the flow of a replay process in the record-and-replay control device according to the third embodiment. A basic configuration of the on-vehicle record-and-replay device 10 is the same as the on-vehicle record-and-replay device 10 of the first embodiment. The on-vehicle record-and-replay device 10 is different from the first embodiment in that the display control unit 126 performs a different process.

If the control signal acquired from the operation control unit 125 indicates an instruction on another replay within a second predetermined period, in other words, an issuance of an instruction on repeat replay, with respect to the event recording data that is replayed and displayed with the first angle of view, the display control unit 126 displays the event recording data by adopting the second angle of view. The second predetermined period is, for example, approximately the same duration as a recording duration of the event recording data. The second predetermined period may be, for example, about a few minutes.

If the instruction on repeat replay is repeatedly issued within the second predetermined period, the display control unit 126 may display the event recording data by changing the angle of view to the second angle of view every time the repeat replay is performed. More specifically, if the instruction on repeat replay is repeatedly issued within the second predetermined period, the display control unit 126 may display the event recording data with the second angle of view by gradually reducing the angle of view every time the repeat replay is performed. If the instruction on repeat replay is repeatedly issued within the second predetermined period, the display control unit 126 may display the event recording data with the second angle of view at the time of first repeat replay, and may display the event recording data with a wider angle of view at the time of second or later repeat replay.

Next, the flow of a process in the record-and-replay control device 100 will be described with reference to FIG. 14. Processes at Step S161, Step S162, Step S164, and Step S167 are the same as the processes at Step S111, Step S114, Step S112, and Step S115 in the flowchart illustrated in FIG. 10.

The record-and-replay control device 100 determines whether the instruction on repeat replay is issued while an elapsed time since issuance of a previous replay instruction is within the second predetermined period (Step S163). If the record-and-replay control device 100 determines that the instruction on repeat replay is issued (Yes at Step S163), the process proceeds to Step S164. If the record-and-replay control device 100 does not determine that the instruction on repeat replay is issued (No at Step S163), the process proceeds to Step S167.

If it is determined that the event detection direction is provided (Yes at Step S164), the record-and-replay control device 100 performs repeat replay of the event recording data, and displays the event recording data by adopting the second angle of view with enlargement in the event detection direction (Step S165). The record-and-replay control device 100 proceeds to Step S167.

If it is determined that the event detection direction is not provided (No at Step S164), the record-and-replay control device 100 performs repeat replay of the event recording data and displays the event recording data with the first angle of view (Step S166). The record-and-replay control device 100 proceeds to Step S167.

In this manner, if the instruction on repeat replay is issued within the second predetermined period since issuance of the replay instruction on the event recording data with the event detection direction, repeat replay is performed and display with the second angle of view with enlargement in the event detection direction is performed on the display unit 240.

As described above, in the present embodiment, if the instruction on repeat replay is issued within the second predetermined time since issuance of the replay instruction on the event recording data with the event detection direction, the display control unit 126 performs repeat replay of the event recording data and displays the event recording data by adopting the second angle of view with enlargement in the event detection direction on the display unit 240. Therefore, it is possible to appropriately check a captured object related to the event when it is desired to check the event status by repeat replay.

Fourth Embodiment

Figure 15:
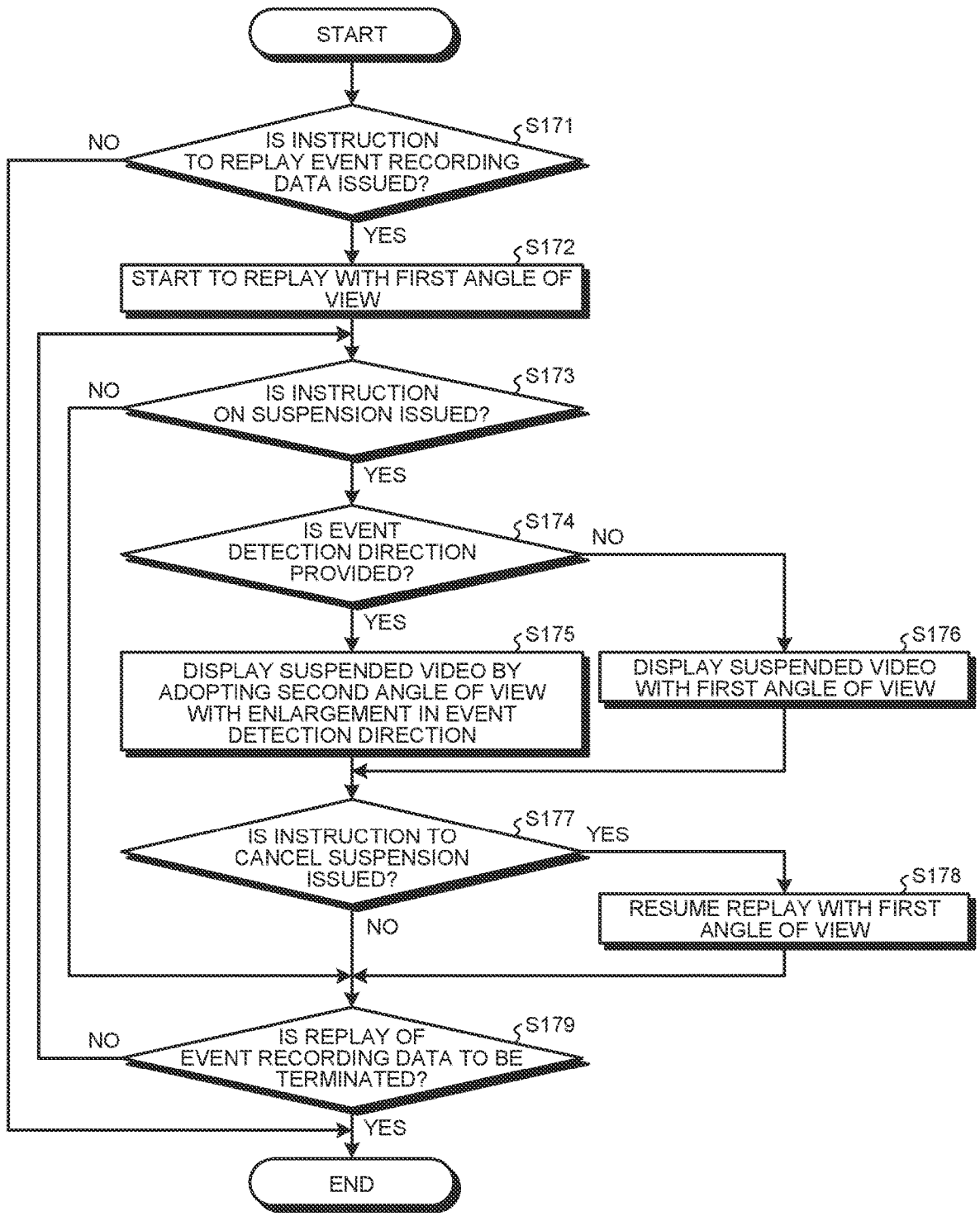
FIG. 15 is a flowchart illustrating the flow of a replay process in a record-and-replay control device according to a fourth embodiment.

An on-vehicle record-and-replay device 10 according to a fourth embodiment will be described with reference to FIG. 15. FIG. 15 is a flowchart illustrating the flow of a replay process in a record-and-replay control device according to the fourth embodiment. A basic configuration of the on-vehicle record-and-replay device 10 is the same as the on-vehicle record-and-replay device 10 of the first embodiment. The on-vehicle record-and-replay device 10 is different from the first embodiment in that the operation control unit 125 and the display control unit 126 perform different processes.

The operation control unit 125 acquires suspension operation information indicating operation of suspending video data and cancel operation information indicating operation of cancelling suspension, and outputs a control signal.

If the control signal acquired from the operation control unit 125 indicates an instruction on suspension with respect to the event recording data that is replayed and displayed with the first angle of view, the display control unit 126 displays the event recording data by adopting the second angle of view.

Next, the flow of the process in the record-and-replay control device 100 will be described with reference to FIG. 15. Processes at Step S171, Step S172, Step S174, and Step S179 are the same as the processes at Step S111, Step S114, Step S112, and Step S115 in the flowchart illustrated in FIG. 10.

The record-and-replay control device 100 determines whether an instruction on suspension is issued (Step S173). If the record-and-replay control device 100 determines that the instruction on suspension is issued (Yes at Step S173), the process proceeds to Step S174. If the record-and-replay control device 100 does not determine that the instruction on suspension is issued (No at Step S173), the process proceeds to Step S179.

If it is determined that the event detection direction is provided (Yes at Step S174), the record-and-replay control device 100 displays a suspended video of the event recording data by adopting the second angle of view with enlargement in the event detection direction (Step S175). The record-and-replay control device 100 proceeds to Step S177.

If it is determined that the event detection direction is not provided (No at Step S174), the record-and-replay control device 100 displays the suspended video of the event recording data with the first angle of view (Step S176). The record-and-replay control device 100 proceeds to Step S177.

The record-and-replay control device 100 determines whether an instruction to cancel suspension is issued (Step S177). If the record-and-replay control device 100 determines that the instruction to cancel suspension is issued (Yes at Step S177), the process goes to Step S178. If the record-and-replay control device 100 does not determine that the instruction to cancel suspension is issued (No at Step S177), the process goes to Step S179.

If it is determined that the instruction to cancel suspension is issued (Yes at Step S177), the record-and-replay control device 100 resumes replay of the event recording data and displays the event recording data with the first angle of view (Step S178). The record-and-replay control device 100 proceeds to Step S179.

In this manner, if the instruction on suspension is issued while the event recording data with the event detection direction is being replayed, the suspended video is displayed on the display unit 240 with the second angle of view with enlargement in the event detection direction.

As described above, in the present embodiment, if the instruction on suspension is issued while the event recording data with the event detection direction is being replayed, the display control unit 126 is able to display the suspended video by adopting the second angle of view with enlargement in the event detection direction on the display unit 240. Therefore, it is possible to more appropriately check a captured object related to the event when it is desired to check the event status in a suspended manner.

Fifth Embodiment

Figure 16:
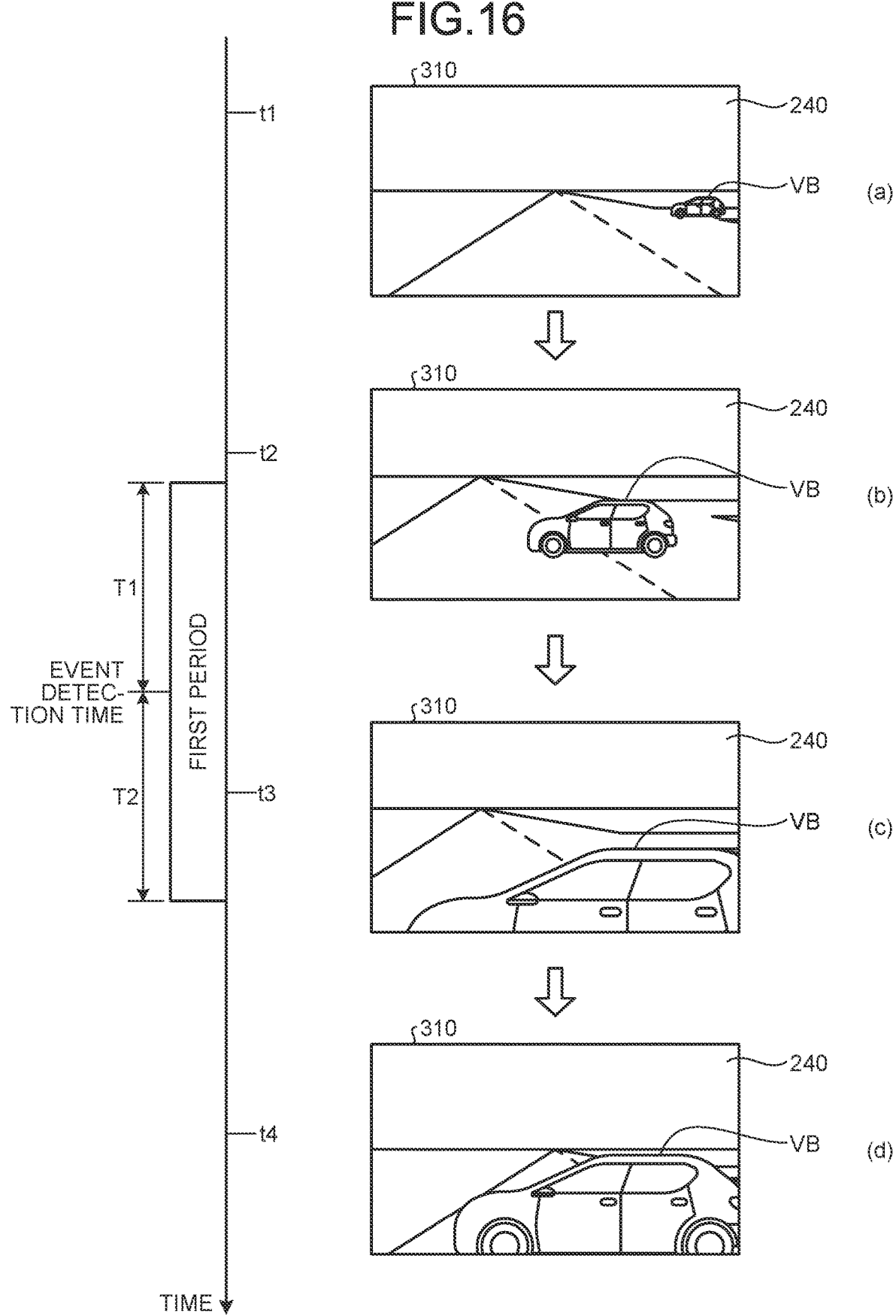
FIG. 16 is a diagram illustrating an example of event recording data displayed on a display unit.
Figure 17:
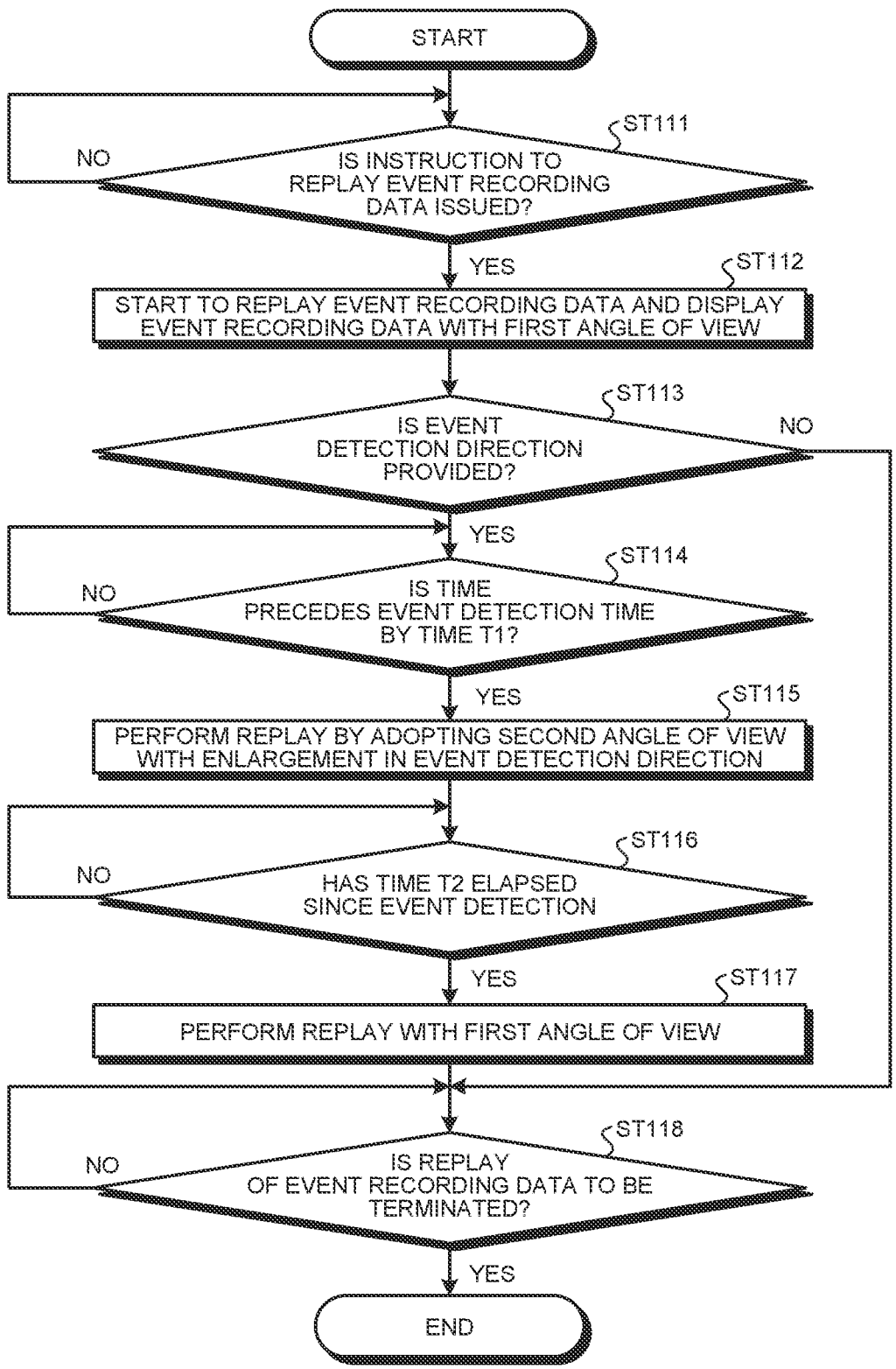
FIG. 17 is a flowchart illustrating the flow of a replay process in the record-and-replay control device according to a fifth embodiment.

An on-vehicle record-and-replay device 10 according to a fifth embodiment will be described with reference to FIG. 16 and FIG. 17. FIG. 16 is a diagram illustrating an example of the event recording data displayed on the display unit. FIG. 17 is a flowchart illustrating the flow of a replay process in the record-and-replay control device 100 according to the fifth embodiment. A basic configuration of the on-vehicle record-and-replay device 10 is the same as the on-vehicle record-and-replay device 10 of the first embodiment. The on-vehicle record-and-replay device 10 displays the event recording data in which an event is recorded with the first angle of view, by adopting the second angle of view that is narrower than the first angle of view, with enlargement in the event detection direction during a first period including an event detected time point.

The display control unit 126 causes the display unit 240 to display the event recording data that is replayed by the replay control unit 124, by adopting the second angle of view with enlargement in the event detection direction during the first period including the event detected time point, on the basis of the information indicating the event detection direction. The second angle of view is narrower than the first angle of view.

The event recording data that is displayed on the display unit 240 by the display control unit 126 will be described with reference to FIG. 16. During a period other than the first period including the event detected time point, the display control unit 126 displays the event recording data with the first angle of view on the display unit 240. During the first period including the event detected time point, the display control unit 126 displays the event recording data with the second angle of view on the display unit 240.

In FIG. 16, (a) illustrates a time t1 prior to the first period. At the time t1, the display control unit 126 displays the replayed event recording data with the first angle of view on the display unit 240. In FIG. 16, (b) illustrates a time t2 that is prior to event detection in the first period. At the time t2, the display control unit 126 displays the event recording data with the second angle of view on the display unit 240. In (b) of FIG. 16, the event recording data that is enlarged in the event detection direction is displayed with a narrow angle of view. In (b) of FIG. 16, the event detection direction is displayed in an enlarged manner as compared to (a) of FIG. 16, so that when, for example, the different vehicle VB crashes, a range including the event detection direction including the different vehicle is displayed in an enlarged manner. In FIG. 16, (c) illustrates a time t3 posterior to the event detected time point in the first period. At the time t3, the display control unit 126 displays the event recording data with the second angle of view on the display unit 240. In (c) of FIG. 16, the event recording data that is enlarged in the event detection direction is displayed with a narrow angle of view. In FIG. 16, (c) illustrates a time posterior to the event detected time point; therefore, when crash of the different vehicle VB has occurred, the different vehicle VB has already crashed, so that the different vehicle VB is displayed in a more enlarged manner as compared to (b) of FIG. 16. In FIG. 16, (d) illustrates a time t4 posterior to the first period. At the time t4, the display control unit 126 displays the event recording data with the first angle of view on the display unit 240. In (d) of FIG. 16, the different vehicle VB is displayed with a wider angle than (c) of FIG. 16. In other words, the display control unit 126 displays the event recording data with the first angle of view during a period other than the first period while the event recording period is being replayed.

Next, the flow of a replay process in the record-and-replay control device 100 will be described with reference to FIG. 17.

The record-and-replay control device 100 determines whether an instruction to replay the event recording data is issued (Step ST111). If the operation control unit 125 acquires operation information indicating the instruction to replay the event recording data, the record-and-replay control device 100 determines that the instruction to replay the event recording data is issued (Yes at Step ST111), and proceeds to Step ST112. If the operation control unit 125 does not acquire the operation information indicating the instruction to replay the event recording data, the record-and-replay control device 100 determines that the instruction to replay the event recording data is not issued (No at Step ST111), and may perform the process at Step ST111 again or terminate the process.

If it is determined that the instruction to replay the event recording data is issued (Yes at Step ST111), the record-and-replay control device 100 starts to replay the event recording data and displays the event recording data with the first angle of view (Step ST112). The record-and-replay control device 100 proceeds to Step ST113.

The record-and-replay control device 100 determines whether the event detection direction is provided (Step ST113). More specifically, if the information indicating the event detection direction is stored together with the event recording data to be replayed, the record-and-replay control device 100 determines that the event detection direction is provided (Yes at Step ST113), and proceeds to Step ST114. If the information indicating the event detection direction is not stored together with the event recording data to be replayed, the record-and-replay control device 100 determines that the event detection direction is not provided (No at Step ST113), and proceeds to Step ST118.

If it is determined that the event detection direction is provided (Yes at Step ST113), the record-and-replay control device 100 determines whether a time precedes the event detected time by a time T1 (Step ST114). If the record-and-replay control device 100 determines that the time precedes the event detected time by the time T1 (Yes at Step ST114), the process proceeds to Step ST115. If the record-and-replay control device 100 does not determine that the time does not precede the event detected time by the time T1 (No at Step ST114), the record-and-replay control device 100 performs the process at Step ST114 again.

If it is determined that the time precedes the event detected time by the time T1 (Yes at Step ST114), the record-and-replay control device 100 displays the replayed event recording data by adopting the second angle of view with enlargement in the event detection direction (Step ST115). The record-and-replay control device 100 proceeds to Step ST116.

The record-and-replay control device 100 determines whether a time T2 has elapsed since the event detected time point in the replayed event recording data (Step ST116). If the record-and-replay control device 100 determines that the time T2 has elapsed since the event detected time point (Yes at Step ST116), the record-and-replay control device 100 proceeds to Step ST117. If the record-and-replay control device 100 does not determine that the time T2 has elapsed since the event detected time point (No at Step ST116), the record-and-replay control device 100 performs the process at Step ST116 again. As for the determination at Step ST116, two options as described below are applicable. One option is to determine whether replay is performed until a certain time point after a lapse of the time T2 since replay of the event detected time point in the replayed event recording data. Another option is to determine whether the time T2 has elapsed since a time at which the event detected time point in the replayed event recording data is replayed, independent of replay situations, such as a situation in which suspension or slow replay is performed.

If it is determined that the time T2 has elapsed since detection of the event (Yes at Step ST116), the record-and-replay control device 100 displays the replayed event recording data with the first angle of view (Step ST117). The record-and-replay control device 100 proceeds to Step ST118.

The record-and-replay control device 100 determines whether replay of the event recording data is to be terminated (Step ST118). If the event recording data is replayed to the end or if operation of stopping replay is performed, the record-and-replay control device 100 determines that replay of the event recording data is to be terminated (Yes at Step ST118), and terminates the process. In cases other than the above, the record-and-replay control device 100 determines that replay of the event recording data is not to be terminated (No at Step ST118), and performs the process at Step ST118 again.

In this manner, the event recording data in which an event is recorded with the first angle of view is displayed by adopting the second angle of view that is narrower than the first angle of view, with enlargement in the event detection direction during the first period including the event detected time point.

As described above, in the present embodiment, the display control unit 126 is able to display the event recording data in which an event is recorded, by adopting the second angle of view that is narrower than the first angle of view, with enlargement in the event detection direction during the first period including the event detected time point. In the present embodiment, enlargement in the event detection direction is performed during the first period including the event detected time point, so that it is possible to easily find a captured object related to the event from the event recording data. In this manner, according to the present embodiment, it is possible to appropriately check the event status.

In the present embodiment, the display control unit 126 is able to display the event recording data with the first angle of view on the display unit 240 during a period other than the first period.

Sixth Embodiment

Figure 18:
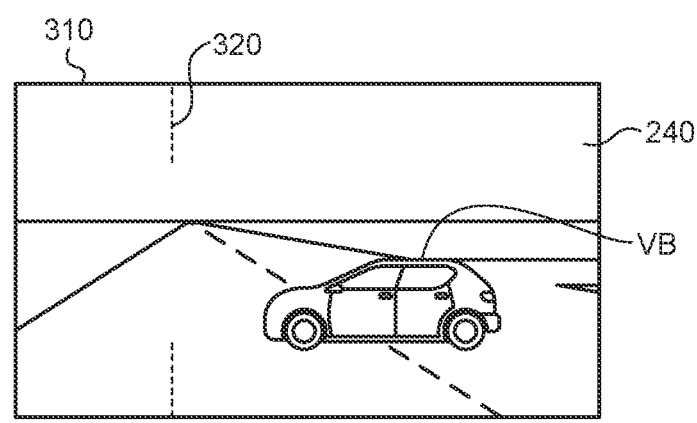
FIG. 18 is a diagram illustrating an example of event recording data displayed on the display unit.

An on-vehicle record-and-replay device 10 according to a sixth embodiment will be described with reference to FIG. 18. FIG. 18 is a diagram illustrating an example of the event recording data displayed on the display unit. The on-vehicle record-and-replay device 10 is different from the fifth embodiment in that the display control unit 126 performs a different process.

The display control unit 126 performs display indicating a horizontal center in the first angle of view when the replayed event recording data is displayed with the second angle of view. More specifically, when the event recording data is displayed with the second angle of view, the display control unit 126 displays a guide line image 320, which indicates the horizontal center in the first angle of view, in a superimposed manner.

In this manner, when the replayed event recording data is displayed with the second angle of view, the horizontal center in the first angle of view is displayed.

As described above, in the present embodiment, when the replayed event recording data is displayed with the second angle of view, the display control unit 126 is able to display the horizontal center in the first angle of view. According to the present embodiment, a user is able to easily recognize whether the event recording data is displayed with the second angle of view and easily recognize the event detection direction.

Seventh Embodiment

Figure 19:
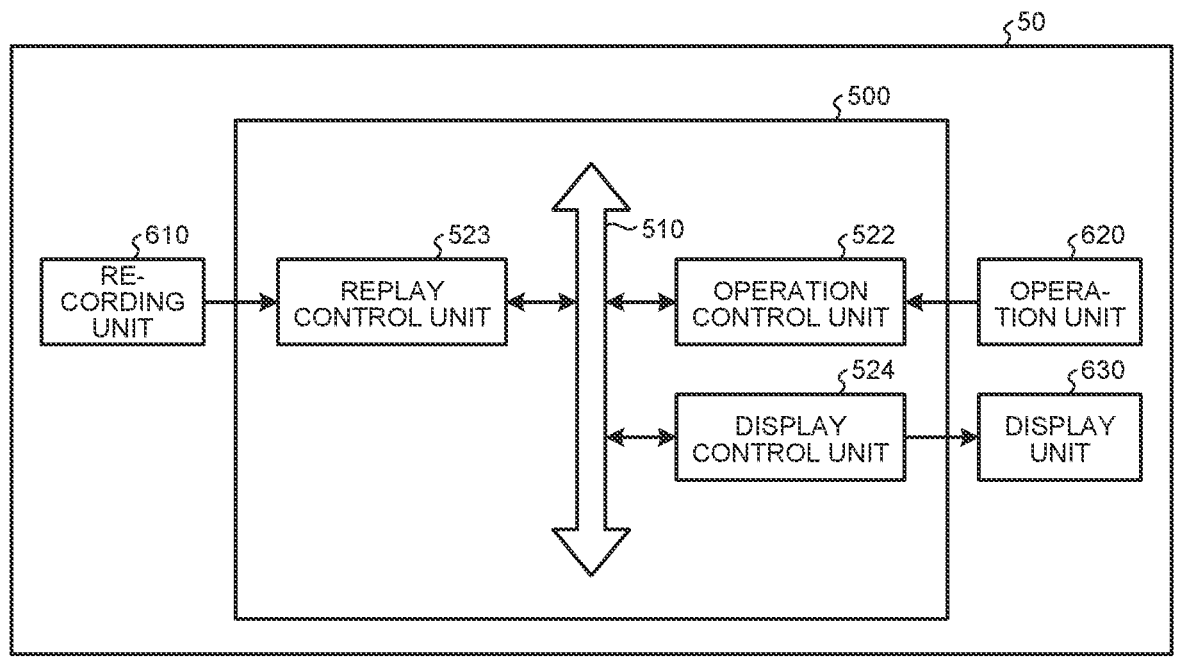
FIG. 19 is a block diagram illustrating a configuration example of a replay device including a replay control device according to a seventh embodiment.

A replay device 50 including a replay control device 500 according to a seventh embodiment will be described with reference to FIG. 19. FIG. 19 is a block diagram illustrating a configuration example of the replay device including the replay control device according to the seventh embodiment.

The replay device 50 displays the event recording data in which an event is recorded with the first angle of view, by adopting the second angle of view that is narrower than the first angle of view, with enlargement in the event detection direction. The replay device 50 is, for example, an electronic device including a personal computer, a smartphone, and a tablet. The replay device 50 includes a recording unit 610, an operation unit 620, a display unit 630, and the replay control device 500.

In the recording unit 610, the event recording data, the information indicating the event detection direction, the loop recording data, and the like are recorded by the on-vehicle record-and-replay device 10 or the like. The recording unit 610 is, for example, a semiconductor memory device, such as a flash memory, or a recording unit, such as a memory card. Alternatively, an external recording unit that is wirelessly connected via a communication device (not illustrated) may be adopted.

The operation unit 620 is able to receive various kinds of operation on the replay device 50. For example, the operation unit 620 is able to receive operation of replaying the event recording data or the loop recording data recorded in the recording unit 610. For example, the operation unit 620 is able to receive operation of deleting the event recording data recorded in the recording unit 610. The operation unit 620 outputs operation information to an operation control unit 522 of the replay control device 500.

The operation unit 620 is a touch panel included in the display unit 630, and, with respect to operation of replaying a piece of event recording data stored in the recording unit 610, issues instructions to select and replay the piece of event recording data when a list of pieces of the event recording data or the like displayed on the display unit 630 is touched. The list of the pieces of event recording data is displayed as thumbnails or the like.

The display unit 630 is, for example, a display including a liquid crystal display, an organic EL display, or the like. The display unit 630 displays a video on the basis of a video signal that is output from a display control unit 524 of the replay control device 500. The display unit 630 displays a video recorded in the recording unit 610.

The replay control device 500 is, for example, an arithmetic processing device (control device) including a CPU or the like. The replay control device 500 loads a stored program onto a memory and executes a command included in the program. The replay control device 500 includes an internal memory (not illustrated), and the internal memory is used to temporarily store data of the replay control device 500. The replay control device 500 includes the operation control unit 522, a replay control unit 523, and the display control unit 524, all of which are connected to a bus 510.

The operation control unit 522 acquires operation information on operation that is received by the operation unit 620. For example, the operation control unit 522 acquires selection operation information indicating operation of selecting video data, replay operation information indicating operation of replaying video data, or deletion operation information indicating operation of deleting video data, and outputs a control signal.

The replay control unit 523 controls replay of the event recording data or the loop recording data recorded in the recording unit 610, on the basis of a control signal of selection operation and replay operation output from the operation control unit 522. If information on the event detection direction is associated with the selected event recording data, the replay control unit 523 outputs the information on the event detection direction to the display control unit 524.

The display control unit 524 causes the display unit 630 to display the event recording data that is acquired by the event information acquiring unit 521, by adopting the second angle of view with enlargement in the event detection direction, on the basis of the information on the event detection direction.

If the control signal acquired from the operation control unit 522 indicates an instruction on slow replay for the event recording data that is replayed and displayed with the first angle of view, the display control unit 524 may display the event recording data with the second angle of view. More specifically, the display control unit 524 may perform the same process as the display control unit 126 of the second embodiment.

If the control signal acquired from the operation control unit 522 indicates an instruction on repeat replay within the second predetermined period with respect to the event recording data that is replayed and displayed with the first angle of view, the display control unit 524 may display the event recording data by adopting the second angle of view. More specifically, the display control unit 524 may perform the same process as the display control unit 126 of the third embodiment.

If the control signal acquired from the operation control unit 522 indicates an instruction on suspension with respect to the event recording data that is replayed and displayed with the first angle of view, the display control unit 524 may display the event recording data by adopting the second angle of view. More specifically, the display control unit 524 may perform the same process as the display control unit 126 of the fourth embodiment.

In this manner, even in the replay device 50 that replays video data stored in the on-vehicle record-and-replay device 10, similarly to the first to the fourth embodiments, the replayed event recording data is displayed with the first angle of view or the second angle of view.

As described above, in the present embodiment, even in the replay device 50 that replays video data stored in the on-vehicle record-and-replay device 10, similarly to the first to the fourth embodiments, it is possible to display the replayed event recording data with the first angle of view or the second angle of view. Thus, according to the present embodiment, it is possible to appropriately check the event status.

Eighth Embodiment

A replay device 50 including a replay control device 500 according to an eighth embodiment will be described with reference to FIG. 19. A basic configuration of the replay device 50 is the same as the replay device 50 of the seventh embodiment.

The replay device 50 displays the event recording data in which an event is recorded with the first angle of view, by adopting the second angle of view that is narrower than the first angle of view, with enlargement in the event detection direction during the first period including the event detected time point.

The operation unit 620 is a touch panel included in the display unit 630, and, with respect to operation of replaying a piece of event recording data stored in the recording unit 610, issues instructions to select and replay the piece of event recording data when a thumbnail image displayed on the display unit 630 is touched.

The replay control unit 523 acquires the selected event recording data or the selected loop recording data from the recording unit 610, and replays the acquired data.

The display control unit 524 controls display of video data on the display unit 630, on the basis of a control signal received from the replay control unit 523. The display control unit 524 outputs a video signal for causing the display unit 630 to output video data. More specifically, the display control unit 524 causes the display unit 630 to display, with the first angle of view, the event recording data or the loop recording data that is recorded in the recording unit 610.

The display control unit 524 causes the display unit 630 to display the event recording data that is replayed by the replay control unit 523, by adopting the second angle of view with enlargement in the event detection direction during the first period including the event detected time point, on the basis of the information indicating the event detection direction.

When the replayed event recording data is displayed with the second angle of view, the display control unit 524 performs display indicating a horizontal center in the first angle of view.

In this manner, even in the replay device 50 that replays the video data stored in the on-vehicle record-and-replay device 10, similarly to the fifth embodiment and the sixth embodiment, the event recording data in which an event is recorded with the first angle of view is displayed by adopting the second angle of view that is narrower than the first angle of view, with enlargement in the event detection direction during the first period including the event detected time point.

As described above, in the present embodiment, even in the replay device 50 that replays the video data stored in the on-vehicle record-and-replay device 10, similarly to the fifth embodiment and the sixth embodiment, it is possible to display the event recording data in which an event is recorded with the first angle of view, by adopting the second angle of view that is narrower than the first angle of view, with enlargement in the event detection direction during the first period including the event detected time point. Thus, according to the present embodiment, it is possible to appropriately check the event status.

While the on-vehicle record-and-replay device 10 according to the present embodiment has been described above, various different embodiments may be made other than the embodiments as described above.

The components of the on-vehicle record-and-replay device 10 illustrated in the drawings are functionally conceptual and need not necessarily be physically configured in the manner illustrated in the drawings. In other words, specific forms of the apparatuses are not limited to those illustrated in the drawings, and all or part of the apparatuses may be functionally or physically distributed or integrated in arbitrary units depending on various processing loads or use conditions of the apparatuses.

The configuration of the on-vehicle record-and-replay device 10 is implemented as, for example, software by a program or the like that is loaded on a memory. In the embodiments as described above, functional blocks that are implemented by cooperation of hardware or software have been described. In other words, the functional blocks may be implemented by various forms, such as by only hardware, by only software, or by a combination of hardware and software.

The components as described above include one that can easily be thought of by a person skilled in the art and one that is substantially identical. Furthermore, the components as described above may be combined appropriately. Moreover, various omission, replacement, and modifications of the components may be made within the scope not departing from the gist of the embodiments.

Figure 20:
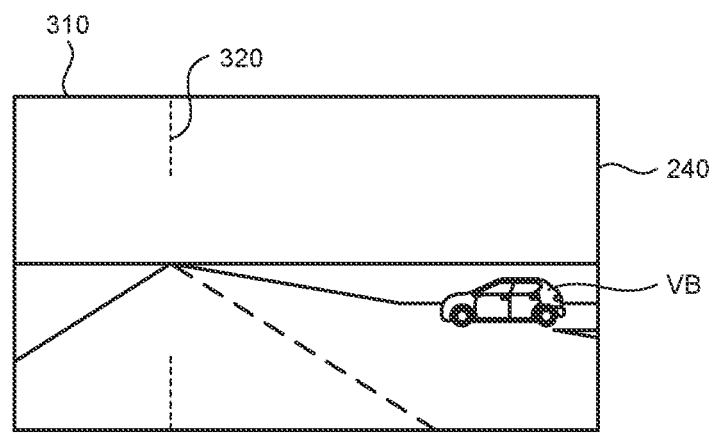
FIG. 20 is a diagram illustrating an example of event recording data displayed on a display unit.

In the above description, when the replayed event recording data is displayed with the second angle of view, the display control unit 126 may perform display indicating the horizontal center in the first angle of view. More specifically, as illustrated in FIG. 20, when the event recording data is displayed with the second angle of view, the display control unit 126 displays the guide line image 320, which indicates the horizontal center in the first angle of view, in a superimposed manner. FIG. 20 is a diagram illustrating an example of the event recording data displayed on the display unit.

In the above description, it is explained that display with the second angle of view that is narrower than the first angle of view, with enlargement in the event detection direction, is performed during the first period including the event detected time point; however, it may be possible to perform suspended display at the event detected time point. With this configuration, it is possible to more appropriately check the event status.

In the above description, a case has been described in which the loop recording process is performed, but the same applies to a case in which imaging is started after an event is detected.

According to some embodiments, it is possible to appropriately check an event status.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A record-and-replay control device comprising:
at least one processor; and
a memory coupled with the processor;
the processor being configured to:
detect, in an acceleration sensor, as an event a change in acceleration caused by impact to a vehicle;
store, in a recording unit, video data captured by a camera configured to capture an image of outside of the vehicle, and store as an event detection direction a direction of the impact corresponding to the change in acceleration detected by the acceleration sensor;
store, in the recording unit, the video data associated with the event detection direction as event recording data with a first angle of view, the stored video data associated with the event detection direction including video data for predetermined periods of time before and after the time at which the corresponding event was detected;
replay, by a replay control unit, the event recording data stored in the recording unit; and
display, by a display unit controlled by display control unit, the event recording data replayed with the first angle of view by the replay control unit when the event recording data does not include information indicating the event detection direction, and to cause the display unit to display the event recording data replayed by the replay control unit, by adopting a second angle of view with enlargement of the image in the event detection direction, when the event recording data includes the information indicating the event detection direction.

2. The record-and-replay control device according to claim 1, wherein the display control unit is configured to selectively switch between display of the event recording data with the first angle of view and display of the event recording data with the second angle of view.

3. The record-and-replay control device according to claim 1, wherein when an instruction on slow replay is issued for the event recording data that is replayed and displayed with the first angle of view, the display control unit displays the event recording data with the second angle of view.

4. The record-and-replay control device according to claim 1, wherein when an instruction on repeat replay is issued within a second predetermined period with respect to the event recording data that is replayed and displayed with the first angle of view, the display control unit displays the event recording data by adopting the second angle of view.

5. The record-and-replay control device according to claim 1, wherein when an instruction on suspension is issued with respect to the event recording data that is replayed and displayed with the first angle of view, the display control unit displays the event recording data by adopting the second angle of view.

6. The record-and-replay control device according to claim 1, wherein when the event recording data is replayed within a first predetermined period since storage of the event recording data, the display control unit displays the event recording data by adopting the second angle of view with enlargement in the event detection direction.

7. The record-and-replay control device according to claim 1, wherein the display control unit displays the event recording data replayed by the replay control unit, by adopting the second angle of view with enlargement in the event detection direction, during a first period including an event detected time point.

8. The record-and-replay control device according to claim 7, wherein the display control unit displays the event recording data replayed by the replay control unit, by adopting the first angle of view during a period other than the first period.

9. The record-and-replay control device according to claim 7, wherein when the replayed event recording data is displayed with the second angle of view, the display control unit performs display indicating a horizontal center in the first angle of view.

10. A replay control device comprising:
at least one processor; and
a buffer memory coupled with the processor;
the processor being configured to:
replay, by a replay control unit, event recording data indicating video data captured with a first angle of view by an imaging unit configured to capture an image of outside of a vehicle, the event recording data being associated with an event detection direction indicating a direction of impact to the vehicle; and display, by a display unit controlled by display control unit, the event recording data, replayed with the first angle of view by the replay control unit when the event recording data does not include information indicating the event detection direction, and to display the event recording data replayed by the replay control unit, by adopting a second angle of view with enlargement of the image in the event detection direction, when the event recording data includes the information indicating the event detection direction.

11. A record-and-replay control method comprising:

acquiring video data captured by an imaging unit configured to capture an image of outside of a vehicle;

detecting as an event a change in acceleration caused by impact to the vehicle;

acquiring as an event detection direction a direction of the impact corresponding to the change in acceleration;

storing, in a recording unit, the video data associated with the event detection direction as event recording data that is captured by the imaging unit with a first angle of view, the stored video data associated with the event detection direction including video data for predetermined periods of time before and after the time at which the corresponding event was detected;

replaying the stored event recording data; and causing a display unit to display the replayed event recording data with the first angle of view when the event recording data does not include information indicating the event detection direction, and to display the replayed event recording data by adopting a second angle of view with enlargement of the image in the event detection direction, when the event recording data includes the information indicating the event detection direction.

* * * * *